(12) United States Patent
Hall

(10) Patent No.: US 11,562,662 B1
(45) Date of Patent: Jan. 24, 2023

(54) SYSTEMS AND METHODS FOR MODULAR MOBILE FLIGHT SIMULATOR FOR AN ELECTRIC AIRCRAFT

(71) Applicant: BETA AIR, LLC, South Burlington, VT (US)

(72) Inventor: Edward Hall, South Burlington, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/527,328

(22) Filed: Nov. 16, 2021

(51) Int. Cl.
| | | |
|---|---|---|
| G09B 9/08 | (2006.01) | |
| G09B 9/16 | (2006.01) | |
| G09B 9/32 | (2006.01) | |
| G09B 9/20 | (2006.01) | |

(52) U.S. Cl.
CPC ............ *G09B 9/085* (2013.01); *G09B 9/165* (2013.01); *G09B 9/203* (2013.01); *G09B 9/206* (2013.01); *G09B 9/326* (2013.01)

(58) Field of Classification Search
CPC . G09B 9/00; G09B 9/08; G09B 9/085; G09B 9/165; G09B 9/203; G09B 9/206; G09B 9/30; G09B 9/302; G09B 9/326; G09B 9/42
See application file for complete search history.

(56) References Cited

U.S. PATENT DOCUMENTS

| | | | | |
|---|---|---|---|---|
| 8,241,038 B2 * | 8/2012 | Quinn | ................... | G09B 9/00 434/30 |
| 8,506,301 B2 * | 8/2013 | Jaszlics | ................... | G09B 9/00 434/29 |
| 9,188,850 B2 | 11/2015 | Turner et al. | | |
| 9,789,411 B2 | 10/2017 | Masutti | | |
| 10,937,332 B2 | 3/2021 | Bell et al. | | |
| 2006/0114171 A1 | 6/2006 | Vascotto et al. | | |

(Continued)

FOREIGN PATENT DOCUMENTS

| | | |
|---|---|---|
| CA | 3113582 A1 | 6/2021 |
| WO | 1986001623 | 3/1986 |

OTHER PUBLICATIONS

Cameron et al., Cost-effective Flight Simulator Technologies, May 10, 2016.

(Continued)

*Primary Examiner* — Timothy A Musselman
(74) *Attorney, Agent, or Firm* — Caldwell Intellectual Property Law

(57) ABSTRACT

A system for modular mobile flight simulator for an electric aircraft is presented. The system includes a simulator module include a concave display, a plurality of projection devices, a pilot interface, wherein the pilot includes a primary flight display and at least a pilot control communicatively connected to a sensor configured to detect a plurality of measure pilot data and generate a pilot datum. The system further includes a computing device configured to receive the pilot datum from the sensor, simulate an aircraft model of the electric aircraft as a function of the pilot datum, blend a plurality of images to be projected by the plurality of projection devices into a distinct image, display the distinct image onto the concave display, generate a feedback, and perform a physical feedback on the simulator module.

20 Claims, 15 Drawing Sheets

(56) References Cited

U.S. PATENT DOCUMENTS

| | | |
|---|---|---|
| 2008/0206720 A1 | 8/2008 | Nelson |
| 2010/0279255 A1 | 11/2010 | Williams, II |
| 2011/0165943 A1 | 7/2011 | O'Neill |
| 2012/0214138 A1 | 8/2012 | Mayr |
| 2019/0073918 A1 | 3/2019 | Tao et al. |
| 2019/0107720 A1 | 4/2019 | Palacios et al. |
| 2020/0312182 A1 | 10/2020 | Smith et al. |
| 2021/0125515 A1* | 4/2021 | Mikic .................... G09B 9/206 |

OTHER PUBLICATIONS

Robinson et al., Flight Simulation: Challenges and User Assessments, Dec. 31, 2004.

* cited by examiner

US 11,562,662 B1

SYSTEMS AND METHODS FOR MODULAR MOBILE FLIGHT SIMULATOR FOR AN ELECTRIC AIRCRAFT

FIELD OF THE INVENTION

The present invention generally relates to the field of flight simulation. In particular, the present invention is directed to a system and method for modular mobile flight simulator for an electric aircraft.

BACKGROUND

The rise of conventional use for electric vehicles pose the challenge of training new pilots for a relatively new and familiar mode of transportation. Electric aircrafts, such as electric vertical take-off and landing (eVTOL) aircrafts, give rise to the challenges and dangers of operating an electric vehicle in the air. Aircraft simulators mimic the operation, environment, and sensation of an electric aircraft flight which can serve to train pilots in a realistic and safe mode. However, the functionality of aircraft simulators may be limited in their limited availabilities in numbers, accuracy of their representation of the aircraft and its flight, and their complex, heavy, and often stationary equipment.

SUMMARY OF THE DISCLOSURE

In an aspect, a system for modular mobile flight simulator for an electric aircraft is presented. The system includes a simulator module, wherein the simulator module includes a concave display, a plurality of projection devices, a pilot interface, wherein the pilot includes a primary flight display and at least a pilot control communicatively connected to a sensor, wherein the sensor is configured to detect a plurality of measure pilot data and generate a pilot datum as a function of the plurality of measure pilot data. The system further includes a computing device communicatively connected to the simulator module, the computing device configured to receive the pilot datum from the sensor, simulate an aircraft model of the electric aircraft as a function of the pilot datum, blend a plurality of images to be projected by the plurality of projection devices into a distinct image, display the distinct image onto the concave display as a function of the plurality of projection devices, generate a feedback datum as a function of the at least a pilot control, and perform a physical feedback on the simulator module as a function of the feedback datum and the aircraft model.

In another aspect, a method for modular mobile flight simulator for an electric aircraft, the method comprising detecting, by a sensor communicatively connected to at least a pilot control of a simulator module, a plurality of measure pilot data, generating a pilot datum as a function of the plurality of measure pilot data, receiving, by a computing device, the pilot datum from the sensor, simulating an aircraft model of the electric aircraft as a function of the pilot datum, blending a plurality of images to be projected by a plurality of projection devices into a distinct image, displaying the distinct image onto a concave display as a function of the plurality of projection devices, generating a feedback datum as a function of the at least a pilot control, and performing a physical feedback on the simulator module as a function of the feedback datum and the aircraft model.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

Figure 1:
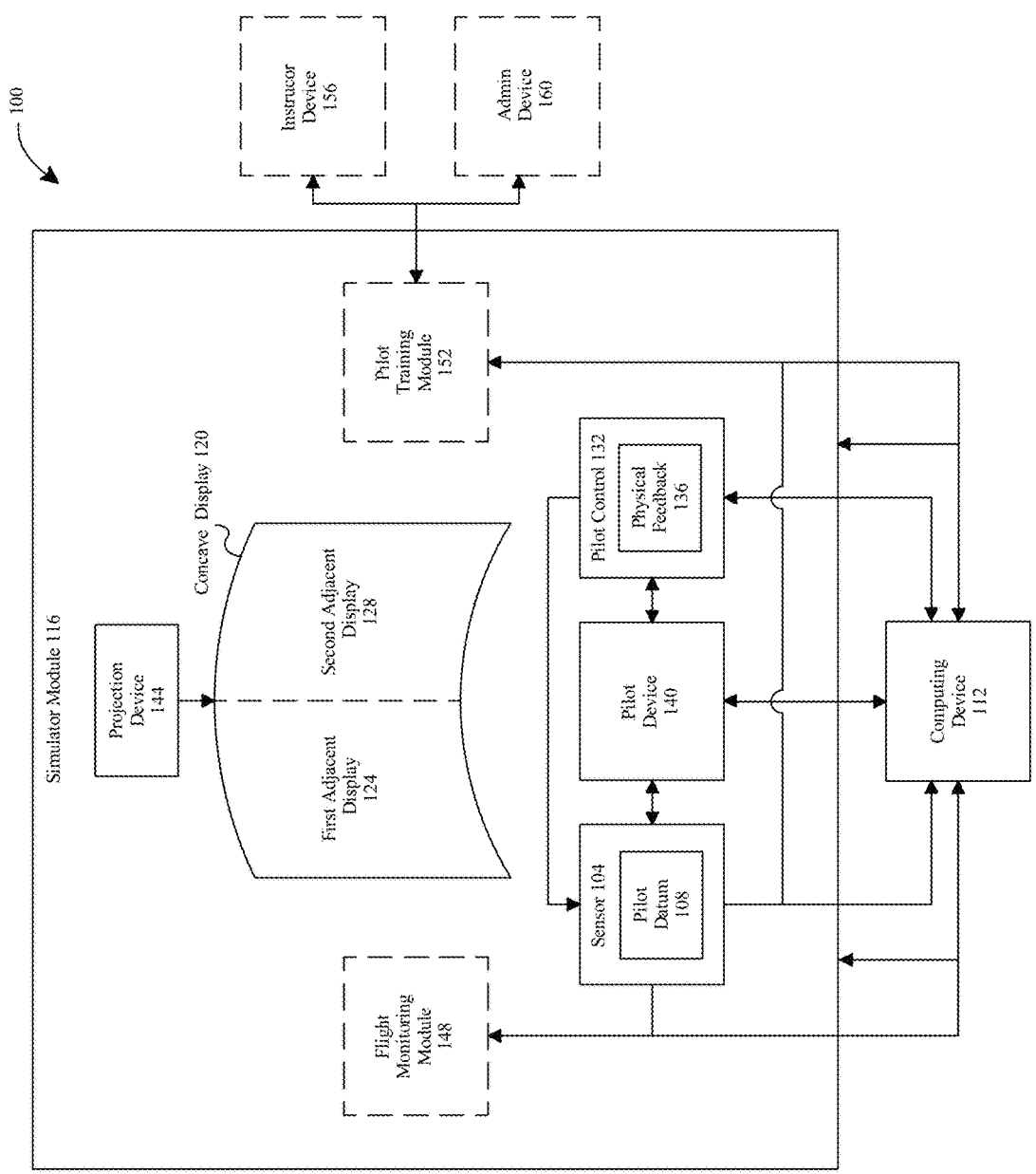
FIG. 1 is a block diagram of an exemplary embodiment of a system for modular mobile flight simulator for an electric aircraft.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to orientations as illustrated for exemplary purposes herein. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply embodiments of the inventive concepts defined in the appended claims. Hence, specific dimensions and other physical characteristics relating to the embodiments disclosed herein are not to be considered as limiting, unless the claims expressly state otherwise.

In the following description, for the purposes of explanation, numerous specific details are set forth in order to provide a thorough understanding of the present invention. It will be apparent, however, that the present invention may be practiced without these specific details. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims.

At a high level, aspects of the present disclosure are directed to systems and methods for modular mobile flight simulator. In an embodiment, aspects of the present disclosure can be used to transport flight simulator equipment. The present disclosure can include modular flight simulator equipment that can be easily packaged and transported to various locations. This is so, at least in part, to efficiently disassemble, package, transport, and reassemble flight simulator equipment and provide increased accessibility of the flight simulator of the present disclosure across various location. In an embodiment, aspects of the present disclosure can be used to electronically disconnect the modular flight equipment parts in the event they are being disassembled and electronically reconnect the modular flight equipment parts in the event they are being reassembled.

Aspects of the present disclosure can be used to imitate a realistic representation of flying an electric aircraft such as an electric vertical take-off and landing (eVTOL) aircraft. In an embodiment, the present disclosure can include a physical cockpit that may be used as the cockpit of the actual eVTOL aircraft. Aspects of the present disclosure can also incorporate augmented reality using a curved display encompassing most of the cockpit of the present disclosure and display a live feed or a virtual representation of the outside of the electric aircraft from the perspective of the electric aircraft. This is so, at least in part, to closely imitate the point of view of a pilot inside the cockpit of a real electric aircraft. Aspects of the present disclosure can also include various devices to produce a variety of physical sensations such as vibrations, turbulence, gravitational forces, etc. configured to mimic the physical sensations experienced in a realistic flight environment.

In an embodiment, aspects of the present disclosure can include multiple projectors to be used to project various images onto a screen to form a single image representing a virtual environment or live feed. In another embodiment, aspects of the present disclosure can include multiple projectors to project, in tandem, different images to form a single distinguishable virtual image. This is so, at least in part, to delineate the computing power used to produce the distinguished image using multiple projectors instead of a single projector. In an embodiment, the screen used to display the image projected by the projectors may include multiple adjacent screens connected together. Each projector may be associated with an adjacent screen to project a unique image which may be blended together to form the singled distinguished image. Exemplary embodiments illustrating aspects of the present disclosure are described below in the context of several specific examples.

Referring now to FIG. 1, a block diagram of an exemplary embodiment of a system 100 for modular mobile flight simulator for an electric aircraft is illustrated. System 100 includes a computing device 112. Computing device 112 may be consistent with any computing device described in the entirety of this disclosure. Computing device 112 may be communicatively connected to a simulator module 116. As used in this disclosure, "communicatively connected" is defined as a process whereby one device, component, or circuit is able to receive data from and/or transmit data to another device, component, or circuit; communicative connecting may be performed by wired or wireless electronic communication, either directly or by way of one or more intervening devices or components. In an embodiment, communicative connecting includes electrically coupling an output of one device, component, or circuit to an input of another device, component, or circuit. Communicative connecting may include indirect connections via "wireless" connection, low power wide area network, radio communication, optical communication, magnetic, capacitive, or optical coupling, or the like. At least pilot control may include buttons, switches, or other binary inputs in addition to, or alternatively than digital controls about which a plurality of inputs may be received. A "simulator module," for the purpose of this disclosure, is a physical component that is a simulation of an aircraft component. For instance and without limitation, simulator module 116 may be consistent with the simulator module in U.S. patent application Ser. No. 17/348,916 and titled, "METHODS AND SYSTEMS FOR SIMULATED OPERATION OF AN ELECTRIC VERTICAL TAKE-OFF AND LANDING (EVTOL) AIRCRAFT," which is incorporated in its entirety in this disclosure herein. Simulator module 116 may include actual aircraft components that have been separated from a functioning aircraft or otherwise de-activated. An "aircraft component," for the purpose of this disclosure, is any component of an electric aircraft. Simulator module 116 may include a model or replica. In some cases, simulator module 116 may include a physical twin of at least a component of an electric aircraft. In a non-limiting embodiment, a physical cockpit of simulator module 116 may include one or more of an aircraft interior, seating, windows, displays, pilot controls, and the like. In a non-limiting embodiment, simulator module 116 may be used to perform a simulated flight mission. As used in this disclosure, a "simulated flight mission" is any use of a simulation device and/or simulator module that includes a simulated flight. Simulator module 116 may include actual aircraft components that have been separated from a functioning aircraft or otherwise de-activated. In a non-limiting embodiment, simulator module 116 may include a partial fuselage. A "partial fuselage," for the purpose of this disclosure, is a portion of a physical fuselage of an electric aircraft used to embody a physical imitation of model of the electric aircraft. In a non-limiting embodiment, the partial fuselage is a portion of the main body of an aircraft and generally contains an aircraft's payload. The partial fuselage may include a physical copy of a fuselage used in an electric aircraft. In a non-limiting embodiment, simulator module 116 may include a seat located in the partial fuselage and at least a physical cockpit. The seat may be identical to a seat of an actual electric aircraft. The at least a physical cockpit may be identical to a physical cockpit of an electric aircraft. Persons skilled in the art, upon reviewing the entirety of this disclosure, will be aware of the various embodiments or replicated physical components of an electric aircraft for a pilot to be located and operate from for simulation purposes as described herein.

Still referring to FIG. 1, simulator module 116 may include a model or replica of a portion of an electric aircraft where a pilot is located. In some cases, simulator module 116 may include a physical twin of at least an aircraft component. The aircraft component may include a plurality of aircraft components to make up simulator module 116 such as, but not limited to, a cockpit, glass window, inceptor stick, pilot seat, a graphical user interface, and the like thereof. For example and without limitation, a physical cockpit may include one or more of an aircraft interior, seating, windows, displays, pilot controls, and the like. A physical cockpit may be used to perform a simulated flight mission. As used in this disclosure, a "simulated flight mission" is any use of a flight simulator 108 that includes a simulated flight. Simulator module 116 and/or physical cockpit may include at least a pilot control 132 configured to interface with a user and/or pilot. At least a "pilot control," for the purpose of this disclosure, is an interactive mechanism or means which allows a pilot to control operation of flight components of an electric aircraft. In a non-limiting embodiment, pilot control 132 may be used by a pilot to manipulate and/or command the components of an electric aircraft and/or simulator module 116. For example and without limitation, pilot control 132 may be a mechanism used to manipulate the movement of a simulated electric aircraft and generate simulated flight maneuvers. Pilot control 132 may be communicatively connected to sensor 104 and receive a pilot input. A "pilot input" for the purpose of this disclosure, is as any gauge, throttle lever, clutch, dial, control, or any other mechanical or electrical device that is configured to be manipulated by a pilot to receive information. In a non-limiting embodiment, pilot control 132 may be physically located in the cockpit of the aircraft or remotely located outside of the aircraft in another location communicatively connected to at least a portion of the aircraft. Pilot control 132 may include buttons, switches, or other binary inputs in addition to, or alternatively than digital controls about which a plurality of inputs may be received. In a non-limiting embodiment, the pilot input may include a physical manipulation of a control like a pilot using a hand and arm to push or pull a lever, or a pilot using a finger to manipulate a switch. In another non-limiting embodiment, the pilot input may include a voice command by a pilot to a microphone and computing system consistent with the entirety of this disclosure. One of ordinary skill in the art, after reviewing the entirety of this disclosure, would appreciate that this is a non-exhaustive list of components and interactions thereof that may include, represent, or constitute, or be connected to sensor 104. In some cases, simulator module 120, the physical cockpit, and pilot control 132 may include sensor 104 and/or be communicatively connected to sensor 104. In a non-limiting embodiment, sensor 104 may be communicatively connected to computing device 112. In some cases, sensor 104 may be configured to detect a user interaction with the at least a pilot control 132. Persons skilled in the art, upon reviewing the entirety of this disclosure, will be aware of the various embodiments and functions of the at least a pilot control for purposes as described herein.

With continued reference to FIG. 1, simulator module 116 may include a concave display 120. A "concave display," for the purpose of this disclosure, is an electronic display with ends flexed toward a central point and forming a concave arc. For instance and without limitation, the concave screen may be consistent with the concave screen in U.S. patent application Ser. No. 17/524,355 and entitled, "SYSTEMS AND METHODS FOR SIMULATING AN ELECTRICAL VERTICAL TAKEOFF AND LANDING (EVTOL) AIRCRAFT," which is herein incorporated by reference in its entirety. In a non-limiting embodiment, concave display 120 may include a monitor or a plurality of monitors to form a concave arc. For example and without limitation, concave display 120 may include one curved display. In another non-limiting example, concave display 120 may include a plurality of flat monitors placed adjacently to form a polygonal concave arc. Alternatively or additionally, the plurality of flat monitors may be arranged in any format. The arrangements of the plurality of monitors may appear as a curved screen and/or flat screen. This is so, at least, in part, to provide flexibility in the arrangements of the monitors based on user preference. In some embodiments multiple adjacent displays may work in tandem to produce images, wherein in the event one or more monitors malfunction, the remaining functional monitors may display a plurality of images to compensate for the malfunctioning monitors. In a non-limiting embodiment, concave display 120 may flex its ends toward the pilot and/or the at least a physical cockpit of simulator module 116. In another non-limiting embodiment, concave display 120 may seem to wrap around the pilot and/or the at least a physical cockpit of simulator module 116. For example and without limitation, concave display 120 may flex its ends to wrap horizontally. In another non-limiting example, concave display 120 may wrap horizontally and/or vertically in the shape of a partial dome. A "partial dome," for the purpose of this disclosure, is a portion of a shape of a dome that encompasses a pilot and/or the at least a physical cockpit of simulator module 116. In a non-limiting embodiment, concave display 120 may include a full dome configured to encompass the pilot to provide a fully immersive simulated experience. For example and without limitation, concave screen 120 may be 180 degrees horizontally curved towards the central point and 180 degrees vertically curved towards the central point. In a non-limiting embodiment, concave display 120 may include a curved display shaped as a partial sphere, wherein the partial sphere is angled between, but not limited to, 180 degrees and 360 degrees, so that the partial sphere may encompass at least a portion of the at least a physical cockpit or enough wherein the pilot may be unable to see outside of concave display 120 in the pilot's peripherals. Persons skilled in the art, upon reviewing the entirety of this disclosure, will be aware of the various embodiments of the concave display for purposes as described herein.

In a non-limiting embodiment, concave display 120 may include an augmented reality device. An "augmented reality device," for the purpose of this disclosure, is an interactive hardware configured to display a digitally enhanced version of a real-world environment. In a non-limiting embodiment, the augmented reality device may include any device that permits a pilot to view a typical field of vision of the user and superimposes virtual images on the field of vision. The augmented reality device may include a computer generated perceptual information related to a flight of an electric aircraft. In a non-limiting embodiment, the augmented reality device may display a computer generated live feed of a physical environment from the perspective of a pilot flying an electric aircraft. In a non-limiting embodiment, the augmented reality device may include any computing device as described herein. In another non-limiting embodiment, the augmented reality device may include any sensor as described herein. Persons skilled in the art, upon reviewing the entirety of this disclosure, will be aware of the various embodiments of computer generated enhancements of perceptual information for simulation purposes as described herein.

Still referring to FIG. 1, augmented reality device 104 may be implemented in any suitable way, including without limitation incorporation of or in a head mounted display, a head-up display (HUD), a display incorporated in eyeglasses, goggles, headsets, helmet display systems, or the like, a display incorporated in contact lenses, an eye tap display system including without limitation a laser eye tap device, VRD, or the like. Augmented reality device may alternatively or additionally be implemented using a projector such as projection device 144, which may display images received generated from simulation device 204, as described in further detail below. In a non-limiting embodiment, concave display 120 may be configured to display any images projected from projection device 144. For example and without limitation, concave display 120 may be configured to display an image representing a virtual environment generated by any simulator as described in the entirety of this disclosure. Concave display 120 may be configured to display an image such as distinct image 208 from projection device 144. Persons skilled in the art, upon reviewing the entirety of this disclosure, will be aware of various optical projection and/or display technologies that may be incorporated in the augmented reality device consistently with this disclosure.

With continued reference to FIG. 1, simulator module 116 may include a locator component. A "locator component," as used in this disclosure, is a device and/or component that a pilot can use to point a cursor at a point on a concave display 120 and/or to draw on an image depicted in concave display 120. The locator component may include without limitation a wired or wireless mouse, a touchpad, a touchscreen, a game controller, or the like. The locator component may include a motion-capture device, such as without limitation a device that tracks motion of offsite surgeon's hands optically and/or using a sensor of motion, which may be implemented in any way suitable for implementation of sensor 104 as described above. In a non-limiting embodiment, the locator component may be incorporated with pilot device 140. In a non-limiting embodiment, the locator component may be used as a function of pilot control 132. Persons skilled in the art, upon reviewing the entirety of this disclosure, will be aware of various ways in which a locator device may be implemented consistently with this disclosure.

With continued reference to FIG. 1, concave display 120 may include one or more adjacent displays communicatively connected to each other to form concave display 120. In a non-limiting embodiment, concave display 120 may include a first adjacent display 124 and a second adjacent display 128. An "adjacent display," for the purpose of this disclosure, is an electronic display configured to display an image and connect to other adjacent displays. First adjacent display 124 and/or second adjacent display 128 may include any display as described consistently with the entirety of this disclosure. In a non-limiting embodiment, first adjacent display 124 and second adjacent display 128 may be identical in shape, size, and/or function. In another non-limiting embodiment, first adjacent display 124 and/or second adjacent display 128 may have some form of concave shape. For example and without limitation, first adjacent display 124 and second adjacent display may be connected on one end of each display to form the concave arc of concave display 120. Persons skilled in the art, upon reviewing the entirety of this disclosure, will be aware of the various combinations, configurations, and shapes of multiple adjacent displays that may be employed in concave display 120 consistently with the entirety of this disclosure.

Still referring to FIG. 1, concave display 120 may be split symmetrically and/or vertically symmetrically wherein the resulting split screens are first adjacent display 124 and second adjacent display 128. This is so, at least in part, to allow for components of simulator module 116 to be modular. For example and without limitation, first adjacent display 124 and/or second adjacent display 128 may be aligned next to each other in any order or formation. In another non-limiting example, first adjacent display 124 and/or second adjacent display 128 may include a primary flight display configured to be at the center of the alignment of displays. First adjacent display 124 and/or second adjacent display 128 may be collapsible, modular, foldable, separable, etc. In a non-limiting embodiment, simulator module 116 and its components may be modular, interchangeable, separable, collapsible, etc. In a non-limiting embodiment, simulator module 116 may include a first simulator housing instrument and/or a second simulator housing instrument. Each housing instrument may be configured to house, store, package, etc., a plurality of components of simulator module 116. In this disclosure, a "first simulator housing instrument" is a first component in which a first group of modular simulator module components is located in. A "modulator simulator module components," for the purpose of this disclosure, are components of simulator module 116 wherein each components are modular. In a non-limiting embodiment, the modulator simulator module components may include, but not limited to, a seat, avionics controls, projections, dashboard, the plurality of displays, inceptor stick, pedals, user device, a part replicating a fuselage, etc. The first simulator housing instrument may include any container used for storage, transportation, delivery, shipping, and the like. In a non-limiting embodiment, any housing instrument may include a shipping container which may include a military grade shipping container. In a non-limiting embodiment, the first group of modular simulator module components may include a plurality of adjacent displays folded, a displays folded onto a flight simulator dashboard, etc. In another non-limiting embodiment, the first group of modular simulator module components may be configured to easily connect, assemble, integrate, etc., with a second group of modular simulator module components.

Still referring to FIG. 1, the second simulator housing instrument may be configured to house a plurality of second simulator module 116 components. In this disclosure, a second "simulator housing instrument" is a second component in which a second group of modular simulator module components is located in. In a non-limiting embodiment, the second group of modular simulator module components may be identical to the first group of modular simulator module components. The second group of modular simulator module components may be any remaining simulator module component not part of the first group of modular simulator module components. The second group of modular simulator module components may include a plurality of simulator module components such as, but not limited to, a seat, avionics controls, dashboard, the plurality of displays, inceptor stick, pedals, user device, a part replicating a fuselage, etc.

Still referring to FIG. 1, simulator module 116 may include a projection device 144 of a plurality of projection devices. A "projection device," for the purpose of this disclosure, is an optical device configured to project an image into a field of vision or any surface. In a non-limiting embodiment, projection device 144 may include any software and/or hardware component that adds inserted images into a concave display 120 signal to be rendered on the concave display 120. Projection device 144 may include any projector consistently described in the entirety of this disclosure. In a non-limiting embodiment, projection device 144 may make use of reflective waveguides, diffractive waveguides, or the like to transmit, project, and/or concave display 120 images. For instance, and without limitation, projection device 144 may project images through and/or reflect images off an eyeglass-like structure and/or lens piece, where either both field of vision and images from projection device 144 may be displayed, or the former may be permitted to pass through a transparent surface. Projection device 144 may be incorporated in a contact lens or eye tap device, which may introduce images into light onto concave display 120 to display such images. Projection device 144 project some images using a virtual retina display (VRD), which may display an image directly on concave display 120 to be viewed by a pilot. Persons skilled in the art, upon reviewing the entirety of this disclosure, will be aware of the various ways of displaying an image onto a surface for viewing and for purposes as described herein.

With continued reference to FIG. 1, projection device 144 may include a plurality of projection devices. In a non-limiting embodiment, simulator module 116 may include four projection device 144. Projection device 144 may be configured to simulate a pilot's point of view in an electric aircraft within a simulated environment. In a non-limiting embodiment, each projection device of the four projection devices may project unique images where each image may be blended, aligned, and/or layered on each other to produce a seemingly single image. For example and without limitation, one projection device may be configured to project images of the sky of a simulated environment from the pilot's point of view. A second projection device may be configured to project images of objects in the sky of the simulated environment such as, but not limited to, clouds, other flying objects, birds, and the like thereof. A third projection device may be configured to display simulated obstacles such as buildings, natural terrain, mountains, and the like thereof. A fourth projection device may be configured to project related flight data such as, but not limited to, altitude, airspeed, vertical speed, heading, angle of attack, and any other flight related measurements. Persons skilled in the art, upon reviewing the entirety of this disclosure, will be aware of the various simulated objects and images that a pilot may view in the point of view of the pilot flying an electric aircraft and the various perceptual images the pilot may require and/or need that any augmented reality device may employ for purpose as described herein.

Still referring to FIG. 1, simulation device 116 may include a pilot device 140. A "pilot device," for the purpose of this disclosure, is an interactive and functional electronic instrument within a physical cockpit used by a pilot that provides crucial information in flight. In a non-limiting embodiment, the pilot device may provide information of a simulated electric aircraft the pilot is piloting such as, but not limited to, altitude, airspeed, vertical speed, heading and much more other crucial information in flight. In a non-limiting embodiment, pilot device 140 may include any computing device consistently with the entirety of this disclosure. In another non-limiting embodiment, pilot device 140 may be configured to support avionics and/or simulated avionics to which a persons skilled in the art, upon reviewing the entirety of this disclosure, will be aware of the implementation of avionics for the purpose of a simulated environment. A "simulated avionics," for the purpose of this disclosure, is an electronic system used on an aircraft or any avionics system integrated for simulator purposes. For example and without limitation, pilot device 140 may include a functional primary flight display (PFD), a functional electronic instrument system (EFIS), a functional electronic horizontal situation indicator (EHSI), and the like thereof. In a non-limiting embodiment, the simulated avionics may include the equipment and electronics to support communication, navigation, multi-system management, and the like thereof. In another non-limiting embodiment, the simulated avionics may be configured in a simulated environment and support simulated communication, navigation, multi-system management, and the like thereof.

With continued reference to FIG. 1, pilot device 140 may include a graphical user interface (GUI), which may include any displays as described above, including without limitation a concave screen 120. In a non-limiting embodiment, the GUI may be configured to display visual indicators that may be used with real electric aircraft, such as but not limited to, altitude, wind speed, aircraft speed, roll, yaw, pitch, flight component status, torque of a flight component, temperature of a battery, power output of a battery, remaining battery charge, battery health, and/or fuel supply. In another non-limiting embodiment, the GUI may display a flight plan in graphical form. Graphical form may include a two-dimensional plot of two variables that represent data received by the controller, such as past maneuvers and predicted future maneuvers. In one embodiment, GUI may also display a user's input in real-time. GUI may be configured to show a primary flight display. The primary flight display may include an airspeed indicator, altitude indicator, slip skid indicator, altimeter, vertical speed indicator (VSI), turn indicator, horizontal situation indicator, and/or a turn rate indicator. In some embodiments, the primary flight display may include a general cruising speed, a ground airspeed, a flap range, a best angle of climb speed, a rotation speed and/or a best rate of climb speed. The PFD may include a transponder code, air temperature, waypoint, distance to waypoint, time and/or compass. In some embodiments, the GUI may display a flight maneuver that was just performed by the pilot, a suggested maneuver to be performed, and a maneuver being currently performed by the pilot. In some embodiments, the GUI may display a different suggested maneuver upon deviation by the user from flight plan. In a nonlimiting example, the GUI may display different color schemes for immediate past maneuver, suggested immediate future maneuver, and a maneuver being currently performed. In one embodiment, additionally to the flight plan, GUI may display an objective and a directional line once objective is nearby. In one embodiment, GUI may display a directional path to the objective when the flight plan is set for an intermediate objective. In a nonlimiting example, the GUI may display a dotted path additionally to the suggested maneuvers and a graphical representation of the objective one user gets near the objective as to assist user when landing or reaching objective. In another nonlimiting example, the GUI may display a dotted line connected to the final objective as to keep user informed of direction of final objective when flight plan is set for an intermediate objective.

With continued reference to FIG. 1, pilot device 140 may include and/or be communicatively connected to pilot control 132. For example, and without limitation, pilot control 132 may include a collective, inceptor, foot bake, steering and/or control wheel, control stick, pedals, throttle levers, and the like. In a non-limiting embodiment, pilot control 132 may be configured to translate a pilot's desired torque for each flight component of plurality of flight simulator components, such as and without limitation, a pusher component and a lift component. In another non-limiting embodiment pilot control 132 may be configured to control, via inputs and/or signals such as from a pilot, the pitch, roll, and yaw of aircraft. For example and without limitation, pilot control 132 may include a throttle lever, inceptor stick, collective pitch control, steering wheel, brake pedals, pedal controls, toggles, joystick, and the like. One of ordinary skill in the art, upon reading the entirety of this disclosure would appreciate the variety of pilot input controls that may be present in an electric aircraft consistent with the present disclosure. For instance and without limitation, the inceptor stick may be consistent with disclosure of inceptor stick in U.S. patent application Ser. No. 17/001,845, and entitled "A HOVER AND THRUST CONTROL ASSEMBLY FOR DUAL-MODE AIRCRAFT", which is incorporated herein by reference in its entirety. Collective pitch control may be consistent with disclosure of collective pitch control in U.S. patent application Ser. No. 16/929,206, and titled "HOVER AND THRUST CONTROL ASSEMBLY FOR DUAL-MODE AIRCRAFT", which is incorporated herein by reference in its entirety. Pilot control 132 may also include any of the pilot controls as disclosed in U.S. patent application Ser. No. 17/218,387, and titled, "METHOD AND SYSTEM FOR FLY-BY-WIRE FLIGHT CONTROL CONFIGURED FOR USE IN ELECTRIC AIRCRAFT," which is incorporated herein by reference in its entirety.

Still referring to FIG. 1, pilot control 132 may be configured to receive and transmit a pilot command to a computing device 112. In this disclosure, "pilot command" is an element of data identifying and/or describing the desire of the pilot to follow a flight path. For example and without limitation, the pilot command may include but are not limited to ascent of the aircraft after takeoff, descent of the aircraft during landing, and the like, among others. The pilot command may be manually entered by pilot and/or may be obtained from autopilot, or the like. Additionally but not limited to, the pilot command may be obtained based on visual cues, tactile cues, flight display, and the like. The pilot command may also be obtained from a pilot who may be located simulator module 116 controlling an electric aircraft remotely. In a non-limiting embodiment, the pilot command may be generated by the input of pilot control 132. In some embodiments, the pilot command may be configured to identify a torque of a flight component of an electric aircraft model as a function of the input of the user. The pilot command may be configured to identify a torque applied to a simulated flight component of a simulation of the electric aircraft based on the user input of the computing device.

Persons skilled in the art, upon reviewing the entirety of this disclosure, will be aware of the various functions and embodiments of a pilot command in the context of simulation for purposes as described herein.

With continued reference to FIG. 1, pilot control 132 may be communicatively connected to a sensor 104. A "sensor," for the purposes of this disclosure, is an electronic device configured to detect, capture, measure, or combination thereof, a plurality of external and electric vehicle component quantities. In a non-limiting embodiment, sensor 104 may include a simulation of sensor 104. For example and without limitation, the simulation of sensor 104 may be identical to sensor 104, wherein the simulation of sensor 104 is configured to perform all the functions of sensor 104 in the context of simulation in which a persons skilled in the art, upon reviewing the entirety of this disclosure, will be aware of the various embodiments of a simulated sensor for purposes as described herein.

Still referring to FIG. 1, sensor 104 may be mechanically and/or communicatively connected to pilot control 132. For example and without limitation, sensor 104 may be connected to a throttle. The throttle may be any throttle as described herein, and in non-limiting examples, may include pedals, sticks, levers, buttons, dials, touch screens, one or more computing devices, and the like. Additionally, a right-hand floor-mounted lift lever may be used to control the amount of thrust provided by the lift fans or other propulsors. The rotation of a thumb wheel pusher throttle may be mounted on the end of this lever and may control the amount of torque provided by the pusher motor, or one or more other propulsors, alone or in combination. Any throttle as described herein may be consistent with any throttle described in the entirety of this disclosure. In a non-limiting embodiment, sensor 104 may be mechanically and communicatively connected to an inceptor stick, wherein the inceptor stick may include any inceptor stick consistently in the entirety of this disclosure. For example and without limitation, sensor 104, as a function of pilot control 132, may be configured to recognize a pilot input which may include a left-hand strain-gauge style STICK for the control of roll, pitch and yaw in both forward and assisted lift flight. A 4-way hat switch on top of the left-hand stick enables the pilot to set roll and pitch trim. Persons skilled in the art, upon reviewing the entirety of this disclosure, will be aware various embodiments and functions of a pilot input and inceptor stick for purposes as described herein.

With continued reference to FIG. 1, sensor 104 may include a motion sensor. A "motion sensor", for the purposes of this disclosure is a device or component configured to detect physical movement of an object or grouping of objects. One of ordinary skill in the art would appreciate, after reviewing the entirety of this disclosure, that motion may include a plurality of types including but not limited to: spinning, rotating, oscillating, gyrating, jumping, sliding, reciprocating, or the like. In a non-limiting embodiment, sensor 104 may include, but not limited to, torque sensor, gyroscope, accelerometer, magnetometer, inertial measurement unit (IMU), pressure sensor, force sensor, proximity sensor, displacement sensor, vibration sensor, LIDAR sensor, and the like. In a non-limiting embodiment, sensor 104 including a LIDAR system may targe an object with a laser and measure the time for at least a reflected light to return to the LIDAR system. LIDAR may also be used to make digital 4-D representations of areas on the earth's surface and ocean bottom, due to differences in laser return times, and by varying laser wavelengths. In a non-limiting embodiment, sensor 104 may include a sensor suite which may include a plurality of sensors that may detect similar or unique phenomena. For example, in a non-limiting embodiment, sensor suite may include a plurality of accelerometers, a mixture of accelerometers and gyroscopes, or a mixture of an accelerometer, gyroscope, and torque sensor.

With continued reference to FIG. 1, sensor 104 may be attached to one or more pilot inputs and attached to one or more pilot inputs, one or more portions of an aircraft, and/or one or more structural components, which may include any portion of an aircraft as described in this disclosure. The pilot inputs may be consistent with any pilot input as described in the entirety of this disclosure. As used herein, a person of ordinary skill in the art would understand "attached" to mean that at least a portion of a device, component, or circuit is connected to at least a portion of the aircraft via a mechanical connection. Said mechanical connection can include, for example, rigid coupling, such as beam coupling, bellows coupling, bushed pin coupling, constant velocity, split-muff coupling, diaphragm coupling, disc coupling, donut coupling, elastic coupling, flexible coupling, fluid coupling, gear coupling, grid coupling, hirth joints, hydrodynamic coupling, jaw coupling, magnetic coupling, Oldham coupling, sleeve coupling, tapered shaft lock, twin spring coupling, rag joint coupling, universal joints, or any combination thereof.

Exemplary methods of signal processing may include analog, continuous time, discrete, digital, nonlinear, and statistical. Analog signal processing may be performed on non-digitized or analog signals. Exemplary analog processes may include passive filters, active filters, additive mixers, integrators, delay lines, compandors, multipliers, voltage-controlled filters, voltage-controlled oscillators, and phase-locked loops. Continuous-time signal processing may be used, in some cases, to process signals which varying continuously within a domain, for instance time. Exemplary non-limiting continuous time processes may include time domain processing, frequency domain processing (Fourier transform), and complex frequency domain processing. Discrete time signal processing may be used when a signal is sampled non-continuously or at discrete time intervals (i.e., quantized in time). Analog discrete-time signal processing may process a signal using the following exemplary circuits sample and hold circuits, analog time-division multiplexers, analog delay lines and analog feedback shift registers. Digital signal processing may be used to process digitized discrete-time sampled signals. Commonly, digital signal processing may be performed by a computing device or other specialized digital circuits, such as without limitation an application specific integrated circuit (ASIC), a field-programmable gate array (FPGA), or a specialized digital signal processor (DSP). Digital signal processing may be used to perform any combination of typical arithmetical operations, including fixed-point and floating-point, real-valued and complex-valued, multiplication and addition. Digital signal processing may additionally operate circular buffers and lookup tables. Further non-limiting examples of algorithms that may be performed according to digital signal processing techniques include fast Fourier transform (FFT), finite impulse response (FIR) filter, infinite impulse response (IIR) filter, and adaptive filters such as the Wiener and Kalman filters. Statistical signal processing may be used to process a signal as a random function (i.e., a stochastic process), utilizing statistical properties. For instance, in some embodiments, a signal may be modeled with a probability distribution indicating noise, which then may be used to reduce noise in a processed signal.

With continued reference to FIG. 1, sensor 104 may be configured to detect a measured pilot data. A "measured pilot data," for the purpose of this disclosure, is a collection of information describing any events related to the pilot of simulator module 116. In a non-limiting embodiment, the measured pilot data may include a plurality of maneuver data. A "plurality of maneuver data," for the purpose of this disclosure, is any collection of information describing completion by the pilot of procedures and concepts that control the electric aircraft, a simulated electric aircraft, and/or the simulator module. For example and without limitation, the plurality of maneuver data may include foundational flight maneuvers, such as straight-and-level turns, climbs and descents, and/or performance maneuvers, such that the application of flight control pressures, attitudes, airspeeds, and orientations are constantly changing throughout the maneuver. For example and without limitation, the plurality of maneuver data may include, ground reference maneuvers, such as turns around a point, s-turns, rectangular ground maneuvering course, eights along A road, eights around pylons, hover taxi, air taxi, surface taxi, and the like. As a further example and without limitation, the plurality of maneuver data may include takeoffs and landings, such as normal takeoff and climb, crosswind takeoff and climb, short field takeoff and climb, normal takeoff from a hover, vertical takeoff to a hover, short field approach and landing, soft field approach and landing, touch and go, power-off 180 approach and landing, normal approach to a hover, crosswind approach to the surface, and the like. The plurality of maneuver data may further include, for example and without limitation, airborne maneuvers, such as trimming the aircraft, slow flight, lazy eights, chandelle, straight and level flight, turns, steep turns, unusual attitudes, spatial disorientation demonstration, hovering, hovering turn, rapid deceleration, reconnaissance procedures, and the like. The plurality of maneuver data, as a further non-limiting example, may include emergency preparedness, such as steep spirals, emergency approach and landing, spins, ditching, autorotation, vortex ring state, retreating blade stall, ground resonance, dynamic rollover, low rotor RPM, systems malfunction, flight diversions, and the like. Further, the plurality of maneuver data may include, as a non-limiting example, instrument procedures, such as aircraft holding procedures, arcing approach, instrument landing system approach, instrument reference climbs and descents, basic attitude instrument flight, and the like. Persons skilled in the art, upon reviewing the entirety of this disclosure, will be aware of various procedures and concepts that may represent the plurality of maneuver data consistently with this disclosure.

With continued reference to FIG. 1, sensor 104 may be configured to generate a pilot datum 108 as a function of the measured pilot data. A "pilot datum," for the purpose of this disclosure, is any datum or element of data describing parameters captured by sensor 104 which may include a collection of information describing the maneuvers made by a pilot operating the simulator module in a computer readable collection. In a non-limiting embodiment, pilot datum 108 may be a standardized collection of data of the measured pilot data, wherein pilot datum 108 may include a plurality of categories denoting information about the electric aircraft, the simulation of the electric aircraft, and the like thereof. For example and without limitation, pilot datum 108 may include, but is not limited to, the pilot input, the pilot command, and the like thereof. In a non-limiting embodiment, pilot datum 108 may include any data captured by any sensor as described in the entirety of this disclosure. Additionally and alternatively, pilot datum 108 may include any element or signal of data that represents crucial flight information captured within a simulation of a flight. For example and without limitation, the crucial flight information may include any data about the virtual environment of the simulated electric aircraft. In a non-limiting embodiment, pilot datum 108 may include a degree of torque that may be sensed, without limitation, using load sensors deployed at and/or around a propulsor and/or by measuring back electromotive force (back EMF) generated by a motor driving the propulsor. In an embodiment, use of a plurality of independent sensors may result in redundancy configured to employ more than one sensor that measures the same phenomenon, those sensors being of the same type, a combination of, or another type of sensor not disclosed, so that in the event one sensor fails, the ability to detect phenomenon is maintained and in a non-limiting example, a user alter aircraft usage pursuant to sensor readings. One of ordinary skill in the art will appreciate, after reviewing the entirety of this disclosure, that motion may include a plurality of types including but not limited to: spinning, rotating, oscillating, gyrating, jumping, sliding, reciprocating, or the like.

With continued reference to FIG. 1, simulator module 116 may be configured to generate and/or support a simulation of a network. A "network", for the purpose of this disclosure, is any medium configured to facilitate communication between two or more devices. The network may include, but not limited to, an artificial neural network, wireless network, radio network, electrical network, broadcast network, and the like thereof. In a non-limiting embodiment, the network may be a public network in which any electric aircraft that may fly within its range may be informed of the recharging station. In another non-limiting embodiment, a plurality of electric aircrafts that fly within the range of the network may be aware of each other's location and communicate via the network using any means of connection such as Wi-Fi, Bluetooth, radio transmission, and the like thereof. In a non-limiting embodiment, the network may be a private network in which the electric aircraft must request access to connect to the network and access the recharging station or other electric aircrafts that are within the network. In a non-limiting embodiment, the network may include a mesh network. The mesh network may include an avionic mesh network. The mesh network may include, without limitation, an avionic mesh network. For instance and without limitation, the avionic mesh network may be consistent with the avionic mesh network in U.S. patent application Ser. No. 17/348,916 and titled "METHODS AND SYSTEMS FOR SIMULATED OPERATION OF AN ELECTRIC VERTICAL TAKE-OFF AND LANDING (EVTOL) AIRCRAFT," which is incorporated herein by reference in its entirety. In some embodiments, the network may include an intra-aircraft network and/or an inter-aircraft network. Intra-aircraft network may include any intra-aircraft network described in this disclosure. Inter-aircraft network may include any inter-aircraft network described in this disclosure. Persons skilled in the art, upon reviewing the entirety of this disclosure, will be aware of the various digital communication and transmissions used for the purpose described herein.

Still referring to FIG. 1, computing device 112 may be communicatively connected to simulator module 116 and its components. In a non-limiting embodiment, computing device 112 may be configured to generate a physical feedback 136 as a function of pilot datum 108 and at least any maneuvers performed by the pilot operating simulator module 116. A "physical feedback," for the purpose of this disclosure, is an electronically generated simulation of physical senses. In a non-limiting embodiment, simulator module 116 may generate physical feedback 136 as a function of computing device 112. For example and without limitation, computing device 112 may associate and/or classify various maneuvers of the simulated aircraft executed by the pilot to a correlated physical and/or sensory response. In a non-limiting embodiment, physical feedback 136 may include haptic feedback. In a non-limiting embodiment, physical feedback 136 may include vibrations, sounds, visual alerts, and the like thereof. For example and without limitation, the pilot may perform a maneuver inside simulator module 116 such as, but not limited to, a turn, spins, loops, rolls, and the like thereof, in which simulator module 116 may imitate and/or recreate the physical sensations experienced by a pilot making such maneuvers in an actual electric aircraft. Simulator module 116 may include a plurality of haptic technologies configured to produce the haptic feedback for the pilot to experience. For example and without limitation, the pilot may perform a maneuver to increase the velocity of the electric aircraft in the simulation in which simulator module 116 may produce an increasingly intensified vibration effect the pilot may feel. The seat of the physical cockpit the pilot is sitting on may shake to produce the vibration effect. In another non-limiting example, simulator module 116 may include speakers to output sirens in the event the pilot performs a dangerous flight maneuver such as, but not limited to, spinning too fast, rolling too fast, increasing the attitude of the simulated electric aircraft past its maximum capacity, flying too low to the ground of the simulated environment and the like thereof. Persons skilled in the art, upon reviewing the entirety of this disclosure, will be aware of the various physical sensations associated with various maneuvers for simulated purposes as described herein.

With continued reference to FIG. 1, simulator module 116 may include a plurality of haptic technologies to replicate the physical sensations of flight maneuvers. A "haptic technology," for the purpose of this disclosure, is any technology that can create an experience of touch by applying forces, vibrations, or motions to the pilot. In a non-limiting embodiment, simulator module 116 may incorporate any vibrating component such as a vibration motor or a linear resonant actuator which is driven by an electronic circuit. In a non-limiting embodiment, the plurality of haptic technologies may include, but not limited to, vibrotactile haptics, ultrasonic mid-air haptics, microfluidics, force controls, surface haptics, and the like thereof. Persons skilled in the art, upon reviewing the entirety of this disclosure, will be aware of the various embodiments and haptic technologies incorporated into a simulator module for simulation purposes and replicating physical sensations as described in the entirety of this disclosure.

Still referring to FIG. 1, simulator module 116 may include a flight monitoring module 148. In a non-limiting embodiment, flight monitoring module 148 may be operating on computing device 112. A "flight monitoring module," for the purpose of this disclosure, is a computing device used to monitor the flight of an electric aircraft in a simulated environment and/or monitor the flight of a simulated electric aircraft. In a non-limiting embodiment, flight monitoring module 148 may include any suitable software and/or hardware as described in the entirety of this disclosure. In an embodiment, flight monitoring module 148 and/or computing device 112 may be designed and configured to receive pilot datum from a sensor coupled to a plurality of controlling components of the electric aircraft and/or simulation of the electric aircraft and display to the pilot, by pilot device 140, pilot datum 108. In a non-limiting embodiment, pilot datum 108 may include a status datum. In a non-limiting embodiment, the status datum may include information describing the status of actual physical simulator module 116 components such as, but not limited to, the physical cockpit, any pilot control (e.g. inceptor stick, throttle, foot pedal, etc.), seat, and the like thereof. A "controlling component," for the purpose of this disclosure, is a structural component and/or control surface of the electric aircraft and/or simulation of the electric aircraft. A structural component is any component of the aircraft that utilizes power, such as the battery pack and/or battery modules, propulsor, rotor, and the like. The control surface is any component of the aircraft, wherein movement of the component enables a pilot to control the flight altitude of the aircraft, such as ailerons, elevator, rudder, spoilers, flaps, slats, air brakes, tabs, winglet, vortex generators, chordwise barriers, and the like.

Still referring to FIG. 1, simulator module 116 may include a pilot training module 152. A "pilot training module," for the purpose of this disclosure, is a computing device used to provide a variety of training lessons to a pilot. In a non-limiting embodiment, pilot training module 124 may be operating on computing device 112. Pilot training module 152 may include any suitable software and/or hardware as described in the entirety of this disclosure. In an embodiment, pilot training module 152 and/or computing device 112 may be designed and configured to receive a lesson selection from the pilot using pilot device 140 and transmit a plurality of lesson modules to pilot device 140 as a function of the lesson selection. Pilot training module 152 and/or computing device 112 may be further configured to receive at least an interaction datum from pilot device 140, receive at least a simulator training datum from a simulator machine 204, and record a module progression datum for each lesson module of the plurality of lesson modules as a function of the interaction datum and the at least a simulator training datum. The "plurality of lesson modules", as described in the entirety of this disclosure, is a collection of data correlated to each course of the plurality of courses required to become a certified electric aircraft pilot. Each course of the plurality of courses may include, for example and without limitation, foundational knowledge, such as definitions, classifications, history and industry information, aircraft and pilot knowledge, such as aircraft instruments, aircraft systems, aeromedical factors and aeronautical decision making, flying environment knowledge, such as airspace, airports, aviation weather, and navigation, regulatory knowledge, such as aircraft classifications, federal aviation administration, flight schools, pilot certifications, flight knowledge, such as hovering maneuvers, vertical takeoff and landing, turning, instrument indicators, and emergency operations, and the like. Simulator machine 204 can include a device that artificially creates and/or re-creates flight of an aircraft and the environment in which the aircraft flies. Simulator machine 204 replicates the equations that govern how aircraft fly, how the pilot and/or aircraft react to applications of flight controls, the effects of other aircraft systems, and how the aircraft reacts to external factors such as air density, turbulence, wind shear, cloud, precipitation, and the like. Persons skilled in the art, upon reviewing the entirety of this disclosure, will be aware of various flight simulators that may be employed as simulator machine as described herein.

With continued reference to FIG. 1, system 100 may include an instructor device 156. An "instructor device," for the purpose of this disclosure, is any additional computing device as described above, wherein the additional computing device is utilized by and/or associated with a certified flight instructor. In a non-limiting embodiment, the certified flight instructor may be interacting with instructor device 156 remotely from the location of simulator module 116 used by a trainee pilot. In another non-limiting embodiment, instructor device 156 may view the same information as displayed on pilot device 140. The certified flight instructor may, at least in part, take over some control of simulator module 116 via instructor device 156. This is so, at least in part, to virtually train a pilot wherein the trainee pilot may better understand the maneuvers made by the certified flight instructor using instructor device 156 in the position of an actual pilot in an electric aircraft. Persons skilled in the art, upon reviewing the entirety of this disclosure, will be aware of the various embodiments of an instructor operating another device for training purposes as described herein.

With continued reference to FIG. 1, system 100 may include an admin device 160. An "admin device," for the purpose of this disclosure, for the purpose of this disclosure, is any additional computing device as described above, wherein the additional computing device is utilized by/associated with an employee of an administrative body, such as an employee of the federal aviation administration. In a non-limiting embodiment, admin device 160 may be utilized by any user that may provide similar and/or limited role as an employee of the federal aviation administration for training purposes. This is so, at least in part, to replicate realistic scenarios in which a pilot may communicate with an administrative body in an actual flight. Persons skilled in the art, upon reviewing the entirety of this disclosure, will be aware of the various embodiments of administrative bodies and functions for training purposes as described herein.

Figure 2:
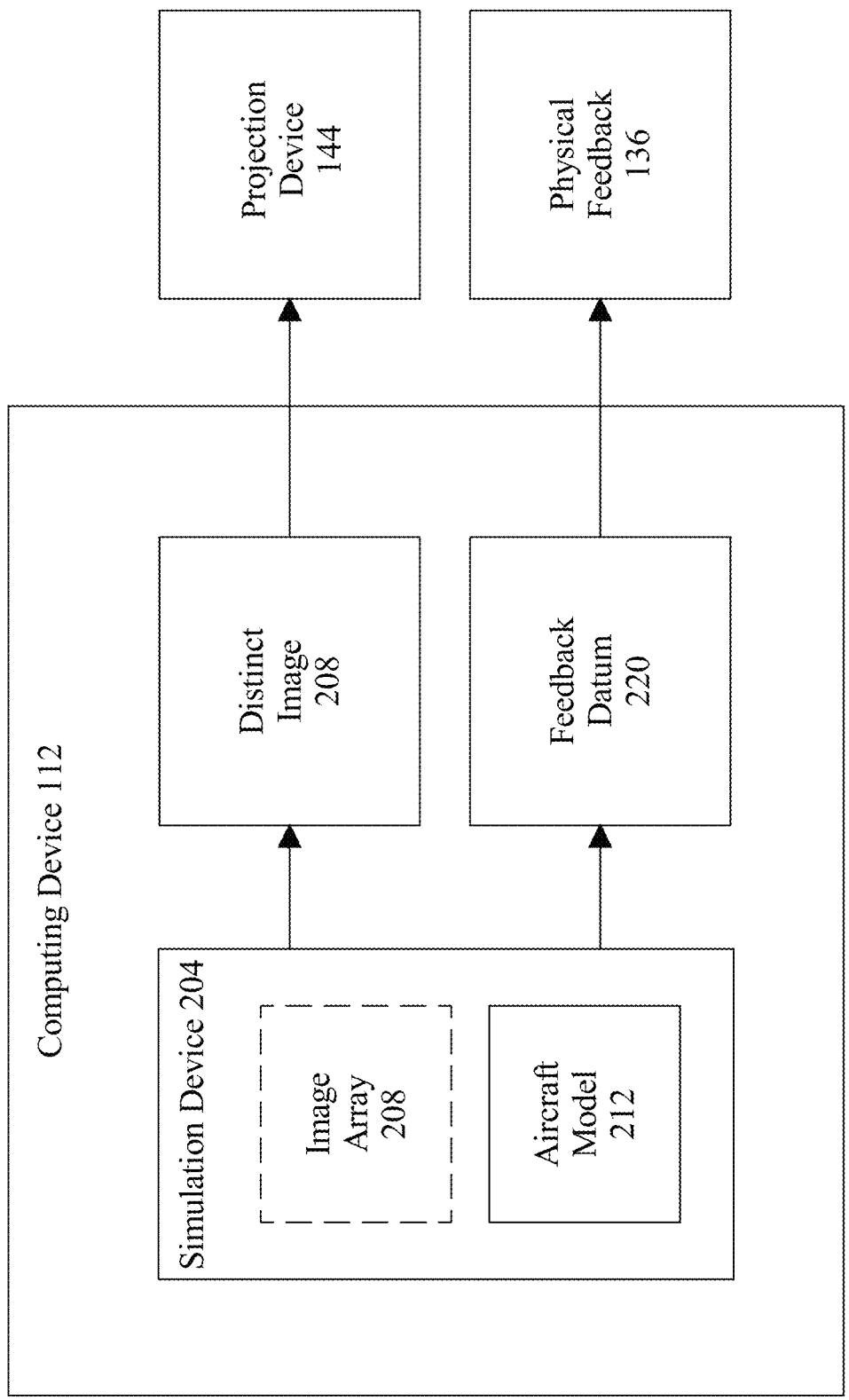
FIG. 2 is an exemplary embodiment of a computing device for a system for modular mobile flight simulator for an electric aircraft.

Referring now to FIG. 2, an exemplary embodiment of a computing device 112 for a system for modular mobile flight simulator for an electric aircraft is illustrated. In a non-limiting embodiment, computing device 112 may include a flight controller. Computing device 112 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. computing device 112 may include a single computing device operating independently, or may include two or more computing device operating in concert, in parallel, sequentially or the like; two or more computing devices may be included together in a single computing device or in two or more computing devices. computing device 112 may interface or communicate with one or more additional devices as described below in further detail via a network interface device. Network interface device may be utilized for connecting computing device 112 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. computing device 112 may include but is not limited to, for example, a computing device or cluster of computing devices in a first location and a second computing device or cluster of computing devices in a second location. computing device 112 may include one or more computing devices dedicated to data storage, security, distribution of traffic for load balancing, and the like. computing device 112 may distribute one or more computing tasks as described below across a plurality of computing devices of computing device, which may operate in parallel, in series, redundantly, or in any other manner used for distribution of tasks or memory between computing devices. computing device 112 may be implemented using a "shared nothing" architecture in which data is cached at the worker, in an embodiment, this may enable scalability of system 100 and/or computing device.

With continued reference to FIG. 2, computing device 112 may be designed and/or configured to perform any method, method step, or sequence of method steps in any embodiment described in this disclosure, in any order and with any degree of repetition. For instance, computing device 112 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. computing device 112 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Still referring to FIG. 2, computing device 112 may be configured to receive pilot datum 108 from sensor 104. In a non-limiting embodiment, computing device 112 may receive pilot datum 108 as a function of pilot control 132. For example and without limitation, any maneuvers a pilot operating simulator module 116 may perform may transmit a signal to computing device 112. In another non-limiting example, every movement or action performed by the pilot may trigger sensor 104 to detect the measured pilot data and generate pilot datum 108 to be transmitted to computing device 112 for further analysis and manipulation.

Still referring to FIG. 2. Computing device 112 may be configured to operate a simulation device 204. A "simulation device," for the purpose of this disclosure, is a program or set of operations that simulate flight. In a non-limiting embodiment, may include a flight simulator. For instance and without limitation, simulation device 204 may be consistent with the flight simulator in U.S. patent application Ser. No. 17/348,916 and titled "METHODS AND SYSTEMS FOR SIMULATED OPERATION OF AN ELEC- TRIC VERTICAL TAKE-OFF AND LANDING (EVTOL) AIRCRAFT" which is incorporated herein in its entirety. In some cases, simulation device 204 may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, simulation device 204 may model an artificial and/or virtual aircraft in flight as well as an environment in which the artificial and/or virtual aircraft flies. In some cases, a simulation device 204 may include one or more physics models, which represent analytically or through data-based, such as without limitation machine-learning processes, physical phenomenon. Physical phenomenon may be associated with an aircraft and/or an environment. For example, some versions of simulation device 204 may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, simulation device 204 may include models representing fluid dynamics. For example, in some embodiments, flight simulator may include a representation of turbulence, wind shear, air density, cloud, precipitation, and the like. In some embodiments, simulation device 204 may include at least a model representing optical phenomenon. For example, flight simulator may include optical models representative of transmission, reflectance, occlusion, absorption, attenuation, and scatter. Flight simulator 108 may include non-analytical modeling methods; for example, the flight simulator may include, without limitation, a Monte Carlo model for simulating optical scatter within a turbid medium, for example clouds.

With continued reference to FIG. 2, simulation device 204 may be configured to simulate at least a virtual representation. As described in this disclosure, a "virtual representation" includes any model or simulation accessible by computing device which is representative of a physical phenomenon, for example without limitation at least an electric aircraft, aircraft component, airspace, and/or simulator module 116. For instance and without limitation, the virtual representation may be consistent with the virtual representation in U.S. patent application Ser. No. 17/348, 916 and titled, "METHODS AND SYSTEMS FOR SIMULATED OPERATION OF AN ELECTRIC VERTICAL TAKE-OFF AND LANDING (EVTOL) AIRCRAFT," which is incorporated herein in its entirety. In some cases, virtual representation may be interactive with simulation device 204. For example, in some cases, data may originate from virtual representation and be input into simulation device 204. Alternatively or additionally, in some cases, the virtual representation may modify or transform data already available to simulation device 204.

Still referring to FIG. 2, the virtual representation may include a distinct image 208. A "distinct image," for the purpose of this disclosure, is a collection of images blended together to form a single coherent image. In a non-limiting embodiment, distinct image 208 may be generated and/or simulated as a function of simulation device 204 and/or computing device 112. In a non-limiting embodiment, distinct image 208 may be projected by projection device 144 onto concave display 120. In a non-limiting embodiment, distinct image 208 may include a virtual representation of a live feed of an airspace, sky, airport, recharging landing station, etc., or the combination thereof. simulation device 204 may be configured to generate and/or simulate a virtual environment for which the pilot may interact, operate, and explore in. A "virtual environment," for the purpose of this disclosure, is a digital world or simulation of an environment for which the pilot may interact in. The virtual environment may include a server for other users utilizing any other simulator module to join in and interact with each other in the virtual environment. The virtual environment may include electrical and/or digital signals representing objects including, but not limited to, airspace, sky, airport, recharging landing station, etc., or the combination thereof. This is so, at least in part, to allow for pilots in training to interact with other real users in a replica of an outside environment. In a non-limiting embodiment, distinct image 208 may include any object viewable from the perspective of a pilot in a cockpit of an electric aircraft within the virtual environment. Distinct image 208 may be a close replica of an outside environment in which an electric aircraft may fly in. Simulation device 204 may constantly render and simulate a plurality of images representing various aspects of the outside environment in which a simulated electric aircraft (e.g. aircraft model 212) may operate in. This is so, at least in part, to provide a realistic representation of what a pilot may see in the perspective of inside the physical cockpit of an electric aircraft in flight for various training purposes as described herein.

With continued reference to FIG. 2, distinct image 208 may include a plurality of obstacles simulated by simulation device 204. The plurality of obstacles may include, but not limited to, buildings, natural terrain, mountains, trees, clouds, night sky, sunlight, other flying objects, turbulence, wind speed, weather, etc., or the combination thereof. Computing device 112 and simulation device 204 may be operating in tandem to render and produce a variety of images representing the outside environment and its obstacles in the point of view of a pilot in an electric aircraft. Persons skilled in the art, upon reviewing the entirety of this disclosure, will be aware of the various obstacles and/or images of the outside environment the electric aircraft may see in the context of simulation as described herein.

With continued reference to FIG. 2, simulation device 204 may generate a plurality of images to be blended and/or aligned with each other to produce a live feed of a virtualization of the outside environment. In a non-limiting embodiment, computing device 112 may generate an array of images to be blended and/or aligned with each other wherein each image of the array may be projected by a different projector of a plurality of projectors. In some embodiments, computing device 112 may associate each projector to display a specific type of images as previously described. In another embodiment, computing device 112 may designate the order in which a projector of a plurality of projectors may project its respective image(s) onto concave display 120. Computing device 112 may be configured to generate distinct image 208 as a function of an image array 208. An "image array," for the purpose of this disclosure, is a combination, listing, and/or memory of multiple rendered images to be projected onto a surface to form a distinct and/or comprehensible image. The resulting image, such as distinct image 108, may be a graphical representation in a video format. For example and without limitation, distinct image 108 may appear as a constantly changing view of the perspective of a pilot inside an electric aircraft based on the maneuvers being made. Persons skilled in the art, upon reviewing the entirety of this disclosure, will be aware of the various embodiments of the distinct image being displayed or constantly modified for simulation purposes as described herein.

With continued reference to FIG. 1, each array of image array 208 may be projected by a different projection device 144, wherein each projection device 144 may point to a central location on concave display 120 and project its respective image array onto the display to form distinct image 208. In a non-limiting embodiment, computing device may include an image database configured to store all instances of images generated. In another non-limiting embodiment, the image database may include one or more tables configured to store the images associated with a unique projection device 144 of a plurality of projection devices. In another non-limiting embodiment, one or more tables may be configured to store images based on a classification and/or category of images such as, but not limited to, aerial objects, surface objects, nature objects, etc. For example and without limitation, one table may store all images of flying objects that may be generated to represent flying objects in the air such as, but not limited to, aircrafts, birds, clouds, rain, snow, lighting, and the like thereof. In another non-limiting example, another table may store all images of surface objects including, but not limited to, mountains, people, buildings, roads, trees, animals, etc. In another non-limiting example, another table may store all images of the sky such as, but not limited to, the Sun, the Moon, stars, a night sky, a sunrise, a sunset, etc. Persons skilled in the art, upon reviewing the entirety of this disclosure, will be aware of the various images and categories they may be associated with for purposes as described herein.

Still referring to FIG. 2, the virtual representation may include a simulation of an electric aircraft such as aircraft model 212. As described in this disclosure, a "virtual representation" includes any model or simulation accessible by computing device which is representative of a physical phenomenon, for example without limitation at least an electric aircraft, aircraft component, and/or simulator module 116. Simulator module 204 and/or computing device 112 may simulate and/or generate aircraft model 212 or the virtual representation of the electric aircraft. For example, in some cases, data may originate from virtual representation and be input into simulation device 204. Alternatively or additionally, in some cases, the virtual representation may modify or transform data already available to simulation device 204.

Still referring to FIG. 2, the virtual representation may include an aircraft model 212. A "aircraft model," for the purpose of this disclosure, is a simulation and/or model of an electric aircraft that embodies a representation and/or graphical image denoting an artificial and/or virtual electric aircraft in flight. In a non-limiting embodiment, aircraft model 212 may include an analytical and/or interactive visual representation of an electric aircraft regarding at least a flight phase of aircraft operations and/or performance capabilities of the electric aircraft. In a non-limiting embodiment, aircraft model 212 may be generated as a function of simulation device 204. At least a "flight phase," for the purpose of this disclosure, is an action or a plurality of actions to be performed by an aircraft to complete a flight or complete a flight plan. In a non-limiting embodiment, aircraft model 212 may include a model that may be altered and/or constantly generated based on the flight maneuvers made by the pilot operating simulator module 116 via pilot control 132 and/or pilot device 140. In a non-limiting embodiment, aircraft model 212 may be consistent with the digital twin in U.S. patent application Ser. No. 17/348,916 and titled, "METHODS AND SYSTEMS FOR SIMULATED OPERATION OF AN ELECTRIC VERTICAL TAKE-OFF AND LANDING (EVTOL) AIRCRAFT," which is incorporated herein in its entirety. In a non-limiting embodiment, simulation of the at least a flight phase may include an element of datum denoting a relative status of aircraft. In an embodiment, and without limitation, the at least a flight phase may denote one or more torques, thrusts, airspeed velocities, forces, altitudes, groundspeed velocities, directions during flight, directions facing, forces, orientations, and the like thereof. In an embodiment, and without limitation, aircraft model 212 may produce a simulation denoting one or more adjustments to an altitude as a function of an adjusted and/or shifted direction during flight. As a further non-limiting example, aircraft model 212 may produce a simulation denoting one or more modifications to an airspeed velocity as a function of a changing and/or altered windspeed velocity. In an embodiment, and without limitation, aircraft model 212 may be configured to include operational data of a flight component for a plurality of simulated conditions. As used in this disclosure "operational data" is information denoting one or more operational functions of a flight component. For example, and without limitation, operational data may denote one or more rotational speeds, torques, forces, rpms, and the like thereof. For example, and without limitation, operational data may denote that a propulsor is rotating at a speed of 800 rpms. As a further non-limiting example, operational data may denote that an aileron is angled at 3.3° upward. In an embodiment, and without limitation, operational data may denote one or more voltage levels, electromotive force, current levels, temperature, current speed of rotation, and the like thereof. In another embodiment, operational data may denote one or more electrical parameters of a flight component such as a voltage, current, and/or ohmic resistance of a flight component. As used in this disclosure a "simulated condition" is a condition and/or environment that is to be simulated for flight condition. For example, and without limitation, simulated conditions may include an environmental condition of a wind force and/or precipitation. As a further non-limiting example, simulated conditions may include one or more alterations and/or modifications of operational datum. The simulation may include algorithms and/or machine learning models, systems, and any combination thereof found in the flight controller. In a non-limiting embodiment, aircraft model 212 may include one or more models describing the performance of one or more components of the model. For example and without limitation, aircraft model 212 may include a model depicting the power consumption for an entire flight or for one portion of a flight, a flight maneuver such as, but not limited to, a landing, a takeoff, a turn, an attitude shift, a change in angle of attack, and the like thereof. In another non-limiting example, aircraft model 212 may include a model depicting the electric aircraft making one or more stops at a charging station, a number of hours to be spent flying given a specific time requirement as a function of the objective constraint, etc. In a non-limiting embodiment, aircraft model 212 may depict any flight that could be affected by any parameters described herein, such as the objective constraint and/or the tunable parameter. In a non-limiting embodiment, the at least a flight phase may include any maneuver of the electric aircraft made to complete a flight. In another non-limiting embodiment, aircraft model 212 may include one or more physics models, which represent analytically or through data-based, such as without limitation machine-learning processes, one or more physical phenomena. One or more physical phenomena may be associated with an aircraft and/or an environment. Persons skilled in the art, upon reviewing the entirety of this disclosure, will be aware of the various embodiments of simulating a model based on various flight requirements and parameters for purposes as described herein.

With continued reference to FIG. 2, in a non-limiting embodiment, some versions of aircraft model 212 may include one or more aerodynamics models, inertial models, mass models, propeller models, pusher motor models, Euler models, sensor models, battery models, and the like thereof. In an embodiment, and without limitation, sensor models may denote one or more representations of injecting noise, failed sensors, white noise potential, transfer functions, and the like thereof. In another embodiment, battery models may denote one or more estimation algorithms, power capabilities, thermal outputs, power capabilities, and the like thereof. In another embodiment, aircraft model 212 may include a simple path and/or a variant path. As used in this disclosure a "simple path" is a less complex algorithm that allows for a faster simulation. In an embodiment, and without limitation, simple path may denote a fast simulation, wherein the enhanced speed reduces the accuracy of aircraft model 212. As used in this disclosure a "variant path" is a more complex algorithm that allows for a slower simulation. In an embodiment, and without limitation, variant path may denote a slow simulation, wherein the reduced speed enhances the accuracy of aircraft model 212. In a non-limiting embodiment, aircraft model 212 may include any data structure and/or program that can simulate one or more relevant aspects of an object or device such as a flight component; one or more relevant aspects may include one or more behaviors affecting a designed use of the flight component to aid in flying and/or navigation of an aircraft. In a non-limiting embodiment, generating and/or simulating aircraft model 212 may include generating and/or simulating one or more flight components of an electric aircraft. This may include generating and/or simulating a flight component of a simulation of an electric aircraft such as aircraft model 212. As used in this disclosure a "flight component" is a portion of an aircraft that can be moved or adjusted to affect one or more flight elements. For example, a flight component may include a component used to affect the aircrafts' roll and pitch which may comprise one or more ailerons. As a further example, a flight component may include a rudder to control yaw of an aircraft. In some embodiments, aircraft model 212 may include a propulsor model. The propulsor model may include a set of data corresponding to a virtual propulsor's torque output. The propulsor model may include a computer program or computer application that represents propulsor torque performance given a certain set of conditions. This set of conditions may include a performance parameter. The performance parameters may include environmental parameters such as air density, air speed, true airspeed, relative airspeed, temperature, humidity level, and weather conditions, among others. The performance parameter may include propulsor parameters that define a propulsors physical characteristics and/or specifications such as material properties, electrical characteristics, propulsor type, weight, geometry, speed, and revolutions per minute (rpm), among others. The performance parameter may include velocity and/or speed in a plurality of ranges and direction such as vertical speed, horizontal speed, changes in angle or rates of change in angles like pitch rate, roll rate, yaw rate, or a combination thereof, among others. Persons skilled in the art, upon reviewing the entirety of this disclosure, will be aware of the various models embodying a simulation and/or model of electric aircraft for purposes as described herein.

With continued reference to FIG. 2, Computing device 112 may be configured to simulate an operation of an electric aircraft. The operation may include any step in a flight sequence. In some embodiments, the operation may include an initialization operation for preparing a flight of an electric aircraft. In some embodiments, the operation may include a takeoff operation. The takeoff operation may include procedures and steps that my correlate to an initial transition from a resting position to a hovering position. In some embodiments, the operation may include a cruising operation. The cruising operation may include procedures and that may correlate to transitioning an electric aircraft from a takeoff position to a cruising position. In some embodiments, the operation may include a landing operation. The landing operation may include procedures and steps that may correlate with landing an electric aircraft. In some embodiments, computing device 112 may be configured to simulate a virtual reality. In some embodiments, computing device 112 may be configured to simulate an augmented reality. In some embodiments, computing device 112 may be configured to simulate an aircraft model 212. aircraft model 212 may include may be configured to include a power system. The power system may include an electrical system that may include a battery pack. In some embodiments, aircraft model 212 may include a flight system. The flight system may include one or more propulsors. The one or more propulsors may include vertical and horizontal propulsors. In some embodiments, the aircraft model 212 may be configured to simulate a weight and dimension of a real electric aircraft. aircraft model 212 may be configured to include a set of aerodynamics. The set of aerodynamics may include data about lift, thrust, air resistance, and other aerodynamic parameters. In some embodiments, aircraft model 212 may be configured to include a plurality of battery packs, battery cells, and/or battery assemblies. Computing device 112 may be configured to generate a plurality of model parameters including a plurality of parameters that may be applied to aircraft model 212. The model parameters may include, but are not limited to, weather, altitude, location, wind speed, aircraft weight, aircraft dimensions, fuel supply, aircraft health, propulsion systems, power systems, cargo status, and/or other parameters, alone or in combination. In a non-limiting embodiment, computing device 112 may be configured to apply the model parameters to aircraft model 212. Computing device 112 may apply the model parameters as a function of a pilot input via pilot control 132. In some embodiments, simulation device 204 may be configured to simulate a plurality of flight scenarios as a function of the model parameters. The flight scenarios may be configured to correspond to a plurality of training courses for a user. In some embodiments, the model parameters may include a battery health and a battery charge status of aircraft model 212. The battery health and batter charge status may include data about battery temperature, battery capacity, battery voltage, battery current, battery integrity, and/or a battery failure.

With continued reference to FIG. 2, computing device 112 may generate a feedback datum 220 as a function of aircraft model 212. A "feedback datum," for the purpose of this disclosure, is a collection of information describing the physical forces resulting from the flight of an electric aircraft and/or aircraft model 212. For example and without limitation, simulation device 204 may simulate a continuous flight of aircraft model 212 based on the maneuvers made by the pilot of simulator module 116 in which computing device 112 may analyze the movements of aircraft model 212 and generate images based on the maneuvers and the virtual environment. In a non-limiting embodiment, computing device may be configured to determine a performance of aircraft model 212. Feedback datum 220 may be generated as a function of aircraft model 212 and/or the performance of aircraft model 212. A "performance" as defined in this disclosure is the difference of an action relative to a desired goal or outcome of the action. The performance may be determined from a plurality of factors. The performance may be determined based on pilot datum 108 and/or pilot control 132. In some embodiments, the performance may be determined relative to the model parameters. In some embodiments, the performance may be determined based on a set of goals of a training course included in the model parameters and/. The performance may include information about aircraft model 212, such as health and fuel supply. In some embodiments the performance may be determined based on a time score. In some embodiments, the performance may be determined based on a flight path taken. In some embodiments, the performance may be determined based on a deviation from a desired flight path. In some embodiments, the performance may be determined based on fuel efficiency. In some embodiments, the performance may be determined based on a landing of aircraft model 212. The landing may be scored based on a plurality of metrics. The landing may be scored based on descent speed. The landing may be scored based on landing accuracy in a landing zone. The landing may be scored based on power efficiency. In some embodiments, computing device 112 may be configured to transform the performance into a feedback datum 220. Feedback datum 220 may be configured to relay the performance data to the pilot. In some embodiments, feedback datum 220 may include a user score. In some embodiments, the user score may be determined by a plurality of factors. In some embodiments, feedback datum 220 may include a breakdown of areas of improvement based on the performance. The areas of improvement may include power efficiency, flight path deviation, electric aircraft health and/or other metrics. In some embodiments, feedback datum 220 may be configured to be displayed on concave screen 128 and or the other display screens. In some embodiments, feedback datum 220 may be a real time feedback shown in pilot inputs 124. In some embodiments, feedback datum 220 may include suggestions for flight maneuvers. In some embodiments, feedback datum 220 may include an average score from a history of simulated flights. In some embodiments, feedback datum 220 may be shown relative to performance of other users. In some embodiments, feedback datum 220 may be shown relative to a goal of a training course. In some embodiments, feedback datum 220 may be configured to display a battery performance metric. The battery performance metric may include, but is not limited to, battery charge, battery health, battery temperature, and/or battery usage. In some embodiments, feedback datum 220 may be configured to suggest a better flight maneuver and/or path to preserve the battery of aircraft model 212. In some embodiments, feedback datum 220 may be configured to take control of pilot control 132 to illustrate a better way of piloting an electric aircraft for a user. In some embodiments, feedback datum 220 may be an auditory stimulus. In some embodiments, the auditory stimulus may include alerts. The alerts may include, but are not limited to, altitude alerts, battery alerts, temperature alerts, speed alerts, propulsion system alerts, collision alerts, or other alerts, alone or in combination. In some embodiments, computing device 112 may be configured to send the performance and feedback datum 220 to an external computing device such as a feedback database. In some embodiments, computing device 112 may retain a history of the performance for a plurality of users in the feedback database.

With continued reference to FIG. 2, computing device may generate physical feedback 136 as a function of feedback datum 136. In a non-limiting embodiment, feedback datum 220 may include signals configured to replicate any haptic feedback as described herein in the entirety of this disclosure. For example and without limitation, feedback datum 208 may denote a pitch, yaw, roll, etc., to a sensation of vibration, turbulence, etc., that the pilot may experience into physical feedback 136. Computing device 112 may send signals to components of simulator module 116 and/or pilot control 132 to produce the physical sensations associated with the flight maneuvers using any haptic technology incorporated into simulator module 116 and/or pilot control 132. For example and without limitation, computing device 112 may generate feedback datum 108 which may include signals and/or information describing the turbulence experience by a pilot when performing a rolling flight maneuver in which computing device 112 may activate any related haptic technologies to produce the turbulence experience when performing a roll. For example, the pilot seat of simulator module 116 may include springs underneath wherein the pilot performing a rolling flight maneuver to the right may be followed by the springs under the seat to push up on the left side of the seat to produce a physical sensation that the pilot is leaning towards the right as a function of the rolling flight maneuver. Persons skilled in the art, upon reviewing the entirety of this disclosure, will be aware of the various embodiments and ways haptic technologies may be used to produce the physical feedback denote by feedback datum 220 and/or the flight maneuvers made.

Still referring to FIG. 2, feedback datum 220 may be generated as a function of a machine-learning model. In a non-limiting embodiment, computing device 112 may train the machine-learning model using a feedback training set and output feedback datum 220 as a function of the feedback training set and pilot datum 108 as an input. A "feedback training set," for the purpose of this disclosure, is a training data that correlates a flight maneuver to an element of feedback. In a non-limiting embodiment, computing device 112 may store any training data, any pilot datum, any feedback datum, any aircraft model, etc., into the feedback database. In another non-limiting embodiment, computing device 112 may retrieve the feedback training data from the feedback database. For example and without limitation, computing device 112, after the pilot performs a flight maneuver such as rolling in the left direction and pitch the nose of the simulated electric aircraft downwards to descend towards a landing location, may generate a feedback training data correlating the flight maneuver performed to an element of feedback representing the physical sensation the flight maneuver may produce. Persons skilled in the art, upon reviewing the entirety of this disclosure, will be aware of the various embodiments of the feedback training data correlating a flight maneuver to an associated physical response for purpose as described herein.

Figure 3:
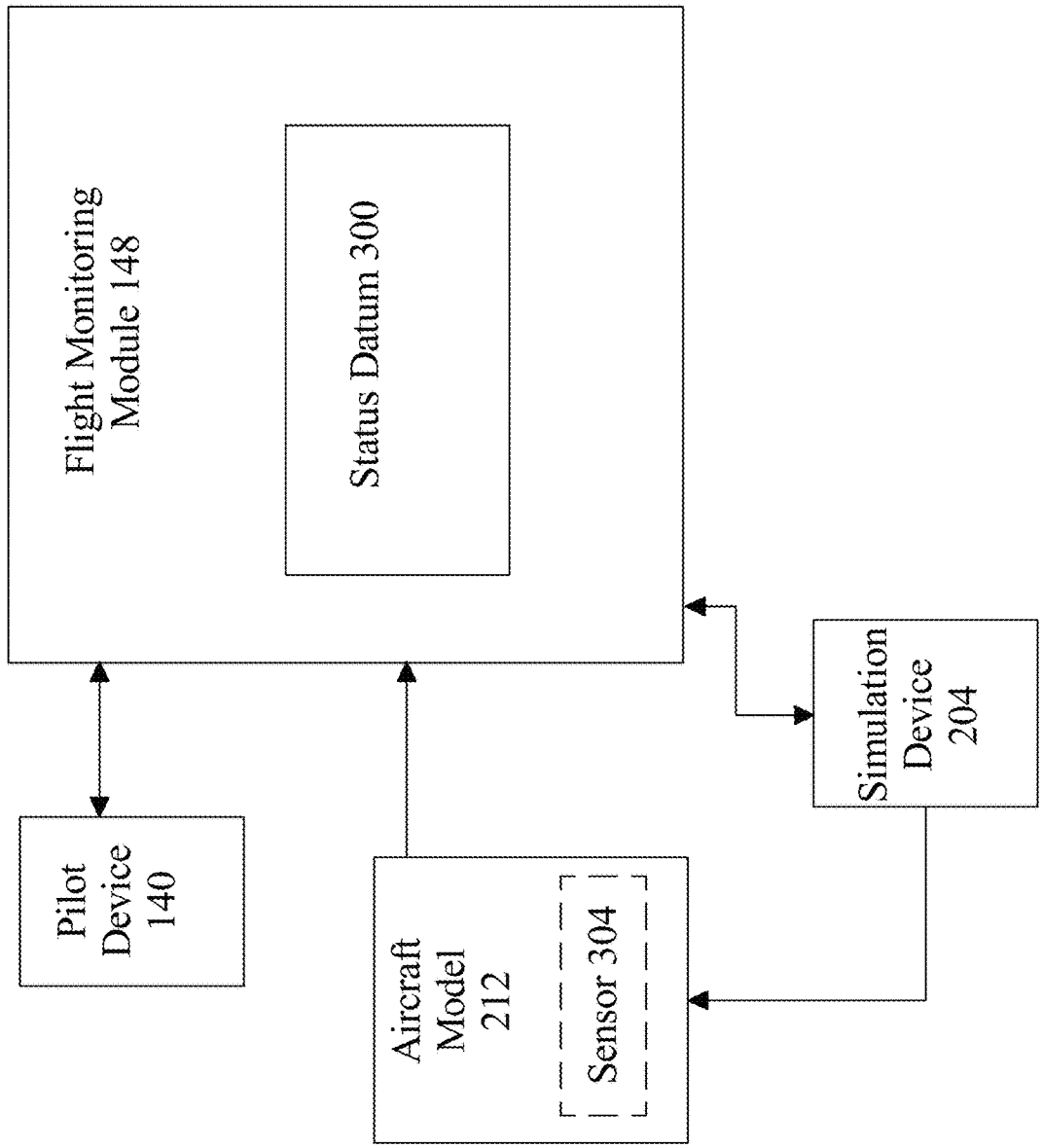
FIG. 3 is a block diagram illustrating an embodiment of a flight monitoring module.

Referring now to FIG. 3, is an embodiment of a flight monitoring module 148 operating on computing device 112, as described in FIG. 1, is illustrated in detail. Flight monitoring module 148 may include any suitable hardware and/or software module. Flight monitoring module 148 and/or computing device 112 may be configured to receive a status datum 300 from sensor 304 disposed on a plurality of controlling components of aircraft model 212. Sensor 304 may include any sensor as described herein. The "status datum" as described in the entirety of this disclosure, is a measure of the functionality of the each controlling component. The measure of functionality may include data describing the health of each controlling component and/or controlling surface. For example and without limitation, the status datum 300 may include data detailing the health of each controlling component, such as the temperature of each controlling component, the amperage of each controlling component, the angle of each controlling component, the speed of each controlling component, damage of each controlling component, any combination thereof, and/or the like. Persons skilled in the art, upon reviewing the entirety of this disclosure, will be aware of various measures of functionality that may be employed as status datum 300 as described herein. The controlling component and/or controlling surface of aircraft model 212 may include any controlling component as described above in further detail in reference to FIG. 2. For example and without limitation, the controlling component may include a structural component and/or control surface of the aircraft model 212. For example and without limitation, a structural component may include any component of the aircraft that utilizes power, such as the battery pack and/or battery modules, propulsor, rotor, and the like. As a further example and without limitation, the control surface may include any component of the aircraft, wherein movement of the component enables a pilot to control the flight altitude of the aircraft, such as ailerons, elevator, rudder, spoilers, flaps, slats, air brakes, tabs, winglet, vortex generators, chordwise barriers, and the like thereof.

Figure 4:
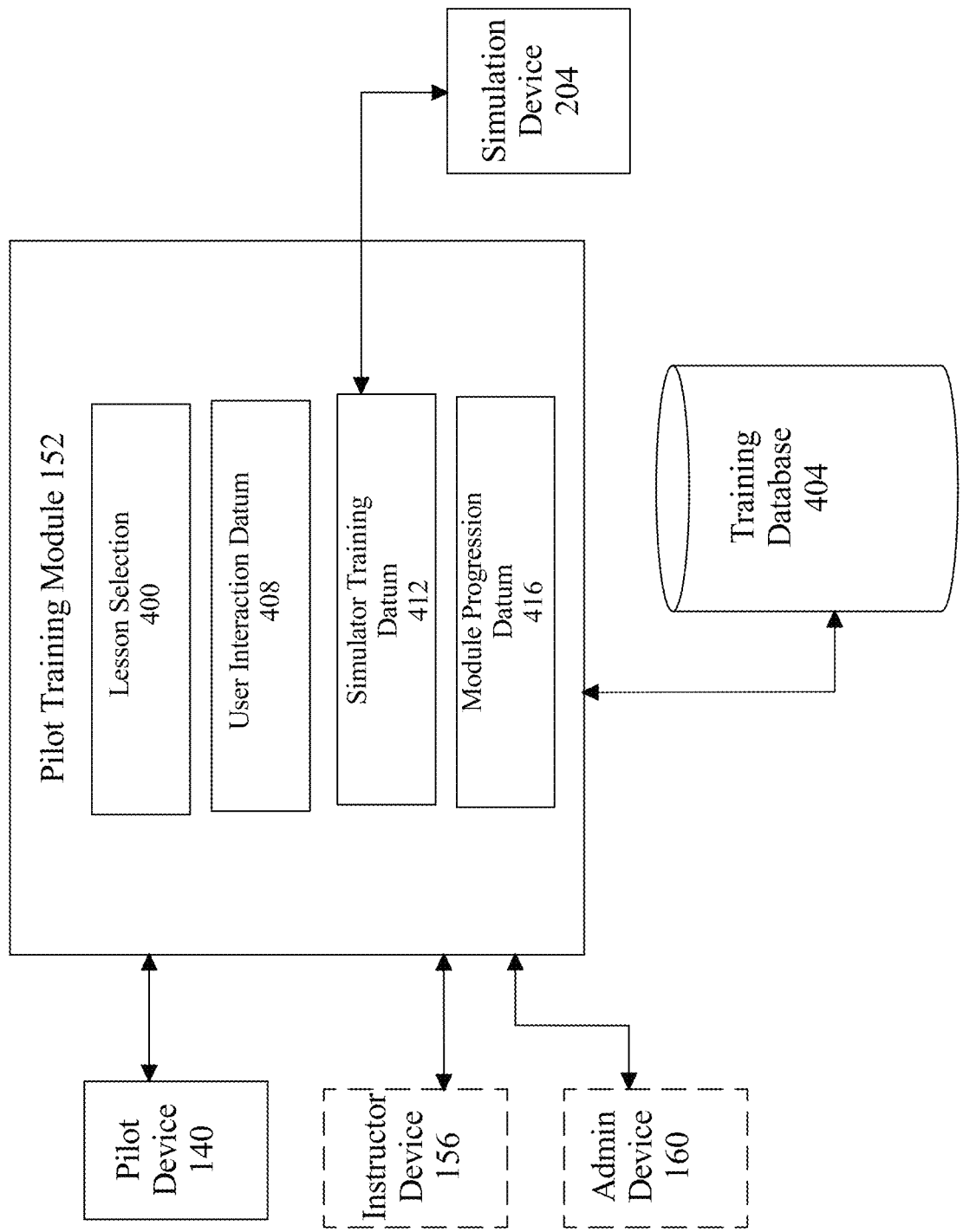
FIG. 4 is a block diagram illustrating an embodiment of a pilot training module.

Referring now to FIG. 4, an embodiment of pilot training module 152, as pictured in FIG. 1, is illustrated in detail. Pilot training module 152 may include any suitable software and/or hardware module as described in the entirety of this disclosure. In an embodiment, pilot training module 152 and/or computing device 112 may be configured to receive a lesson selection 400 from pilot device 140. The "lesson selection" as used in the entirety of this disclosure, is the lesson module of the plurality of lesson modules pilot device 140 has selected to engage with. The lesson module may include any lesson module as described in the entirety of this disclosure. Lesson selection 400 may include a lesson and/or sub-topic of the coursework required to become an electric aircraft certified pilot. Receiving lesson selection from pilot device 140 may include selecting a lesson module from a drop-down menu of the plurality of lesson modules, a list, a visual display, and the like. Lesson selection 400 may include, as an example and without limitation, the lesson module next to complete in the electric aircraft pilot certification. As a further example and without limitation, lesson selection 400 may include the lesson module of the plurality of lesson modules that the user device was engaged with on the last authenticated use of system 100.

With continued reference to FIG. 4, pilot training module 152 and/or computing device 112 may be configured to transmit a plurality of lesson modules from training database 404 to pilot device 140 as a function of lesson selection 400. Pilot training module 152 and/or computing device 112 may include or communicate with training database 404. Training database 404 may be implemented as any database and/or datastore suitable for use as training database 404 as described in the entirety of this disclosure. An exemplary embodiment of training database 404 is included below in reference to FIG. 5. The plurality of lesson modules may include any lesson module as described herein in the entirety of this disclosure. The plurality of lesson modules are a collection of data correlated to each course of the plurality of courses required to become a certified electric aircraft pilot. Each course of the plurality of courses may include, for example and without limitation, foundational knowledge, such as definitions, classifications, history and industry information, aircraft and pilot knowledge, such as aircraft instruments, aircraft systems, aeromedical factors and aeronautical decision making, flying environment knowledge, such as airspace, airports, aviation weather, and navigation, regulatory knowledge, such as aircraft classifications, federal aviation administration, flight schools, pilot certifications, in-flight knowledge, such as hovering maneuvers, vertical takeoff and landing, turning, instrument indicators, and emergency operations, and the like. Each lesson module of the plurality of lesson modules may include assessments and activities to be completed by the user utilizing pilot device 140, simulation device 204, aircraft model 212 and/or any combination thereof. Each lesson module may be designed to enable a user associated with pilot device 140 to become proficient at each course of the plurality of courses required to become a certified electric aircraft pilot. In an embodiment, the courses required to become a certified electric aircraft pilot may include any coursework from any aircraft certification and/or permission, such as, for example and without limitation, fixed conventional, fixed wing complex, light sport, private pilot, instrument, complex, multi-engine, high performance, tail wheel, sea plane, rotorcraft, powered lift, commercial, ATP, any combination thereof, and/or the like. Persons skilled in the art, upon reviewing the entirety of this disclosure, will be aware of various courses and/or coursework that may represent the plurality of lesson modules consistently with this disclosure.

Still referring to FIG. 4, pilot training module 152 and/or computing device 112 may be further configured to receive an interaction datum 408 from pilot device 140. Each interaction datum 408 correlates to a respective lesson module of the plurality of lesson modules, such that interaction datum 408 includes the latest interactions of pilot device 140 with pilot training module 152, including the data associated with the interaction, such as a mouse click, a gesture on a touch screen, a keyboard stroke, movement of an input device (e.g. a joystick, switch, button, etc.), voice command, or any combination thereof, to name a few. Each interaction datum 408 may include, for example and without limitation, an interaction with a displayed reading, activity, assessment, and the like. Each interaction datum 408 may include a set of answers for an assessment, a typographical entry correlating to an answer to a question, a video response, any combination thereof, and/or the like. An interaction datum 408 can be configured to correlate to the position of a user and/or pilot device 140 within the plurality of lesson modules. Pilot training module 152 and/or computing device 112 is further configured to receive at least a simulator training datum 412 from simulation device 204. Simulation device 204 may include any simulator machine as described in the entirety of this disclosure. Each simulator training datum 412 can be correlated to a respective lesson module of the plurality of lesson modules, such that the respective simulator training datum 412 includes the latest interactions of simulation device 204 with pilot training module 152, including the data associated with the interaction. A simulator training datum 412 may include, for example and without limitation, data associated with a simulation flight utilizing simulation device 204. The simulation flight utilizing simulation device 204 may be utilized as an assessment, practice, and the like. Simulator training datum 412 may also include, for example and without limitation, data representing an interaction with simulation device 204 wherein the user is performing a maneuver, skill, and/or technique included in each lesson module of the plurality of lesson modules. Simulator training datum 412 may further include any type of media, for example and without limitation, a video of the simulation flight, a textual summary of the simulator flight, a notification of a completed maneuver, and the like. The latest received simulator training datum 412 can be correlated with the position of the user and/or pilot device 140 within the plurality of lesson modules. Persons skilled in the art, upon reviewing the entirety of this disclosure, will be aware of various inputs that may represent the at least an interaction datum and the at least a simulator training datum consistently with this disclosure.

Continuing to refer to FIG. 4, pilot training module 152 and/or computing device 112 may be further configured to record a module progression datum 416 for pilot device 140 in training database 404 for each lesson module of the plurality of lesson modules as a function of the at least a user device interaction datum 408 and a simulator training datum 412. The "module progression datum" as described in the entirety of this disclosure, is the furthest point of progress of pilot device 140 of the plurality of modules for each authenticated use of pilot device 140 in system 100, including the data associated. Module progression datum 416 may include, for example and without limitation, data representing that pilot device 140 is halfway through an assignment of a lesson module of the plurality of lesson modules. For example and without limitation, module progression datum 416 may include three interaction datum 408 received from pilot device 140, however the lesson is not complete until two at least a simulator training datum 412 are received from simulation device 204. In the non-limiting example, pilot training module 152 will record module progression datum 416, detailing the progress of the user and/or pilot device 140, in training database 404. As a further example and without limitation, module progression datum 416 may include data representing that pilot device 140 is repeatedly failing a simulator maneuver assignment, such as when the user has to perform a specific technique in simulation device 204. Further module progression datum 416 can include data indicating that all required interaction datum 408 have been received from pilot device 140 but further that a simulator training datum 412 successfully performing the maneuver technique has not been received from simulation device 204. In embodiments, pilot training module 152 and/or computing device 112 can record module progression datum 416, detailing the progress of the user and/or user device of the particular lesson modules of the plurality of lesson modules, in training database 404. Persons skilled in the art, upon reviewing the entirety of this disclosure, will be aware of various datums that may represent the module progression datum consistently with this disclosure.

With continued reference to FIG. 4, in an embodiment, instructor device 156 may be configured to communicate with pilot training module 152 utilizing any means of communication as described in the entirety of this disclosure. Instructor device 156 may be configured to access any data tables and/or data set included in training database 404. Instructor device 116 may include any instructor device as described in the entirety of this disclosure. In an embodiment, admin device 160 may be configured to communicate with pilot training module 152 utilizing any means of communication as described in the entirety of this disclosure. Admin device 160 may be configured to access any data tables and/or data set included in training database 404 or other database associated with pilot training module 152. Admin device 160 may include any admin device as described in the entirety of this disclosure.

Figure 5:
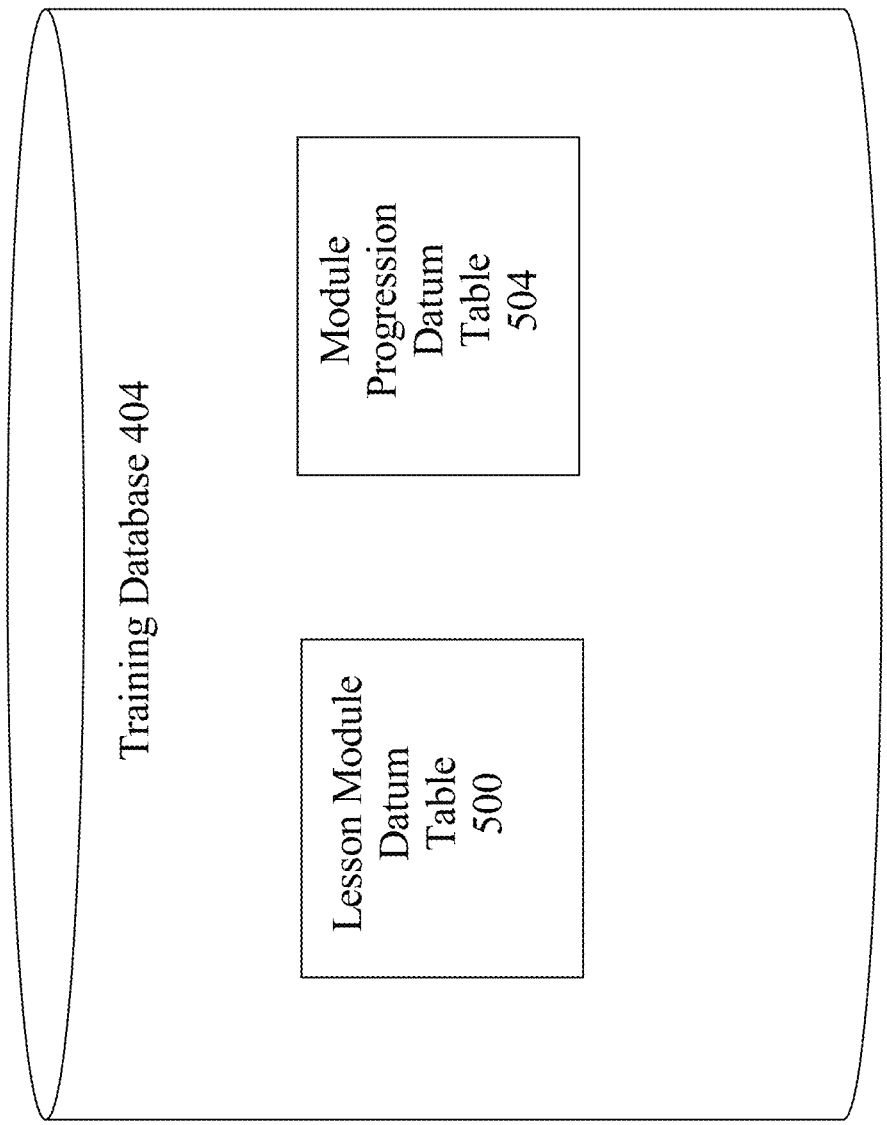
FIG. 5 is a block diagram illustrating an embodiment of a training database.

Referring now to FIG. 5, an embodiment of training database 404 is illustrated. Training database 404 may include any data structure for ordered storage and retrieval of data, which may be implemented as a hardware or software module. Training database 404 may be implemented, without limitation, as a relational database, a key-value retrieval datastore such as a NOSQL database, or any other format or structure for use as a datastore that a person skilled in the art would recognize as suitable upon review of the entirety of this disclosure. Training database 404 may include a plurality of data entries and/or records corresponding to verification elements as described above. Data entries and/or records may describe, without limitation, data concerning authentication datum and failed authentication datum.

Still referring to FIG. 5, one or more database tables in training database 404 may include, as a non-limiting example, a lesson module datum table 500. Lesson module datum table 500 may be a table storing the plurality of lesson modules. For instance, and without limitation, training database 404 may include a lesson module datum table 500 listing each lesson module of the plurality of lesson modules, the associated data of each lesson module, such as assignments, readings, assessments, and the like, the interaction datum 508, and the at least a simulator training datum 512.

Continuing to refer to FIG. 5, one or more database tables in training database 404 may include, as a non-limiting example, a module progression datum table 504. Module progression datum table 504 may be a table storing module progression datum 416 and/or associating lesson selection 500 to the stored module progression datum. For instance, and without limitation, training database 404 may include a module progression datum table 504 listing module progression datum 416 correlated to each lesson module of the plurality of lesson modules. Tables presented above are presented for exemplary purposes only; persons skilled in the art will be aware of various ways in which data may be organized in training database 404 consistently with this disclosure.

Figure 6:
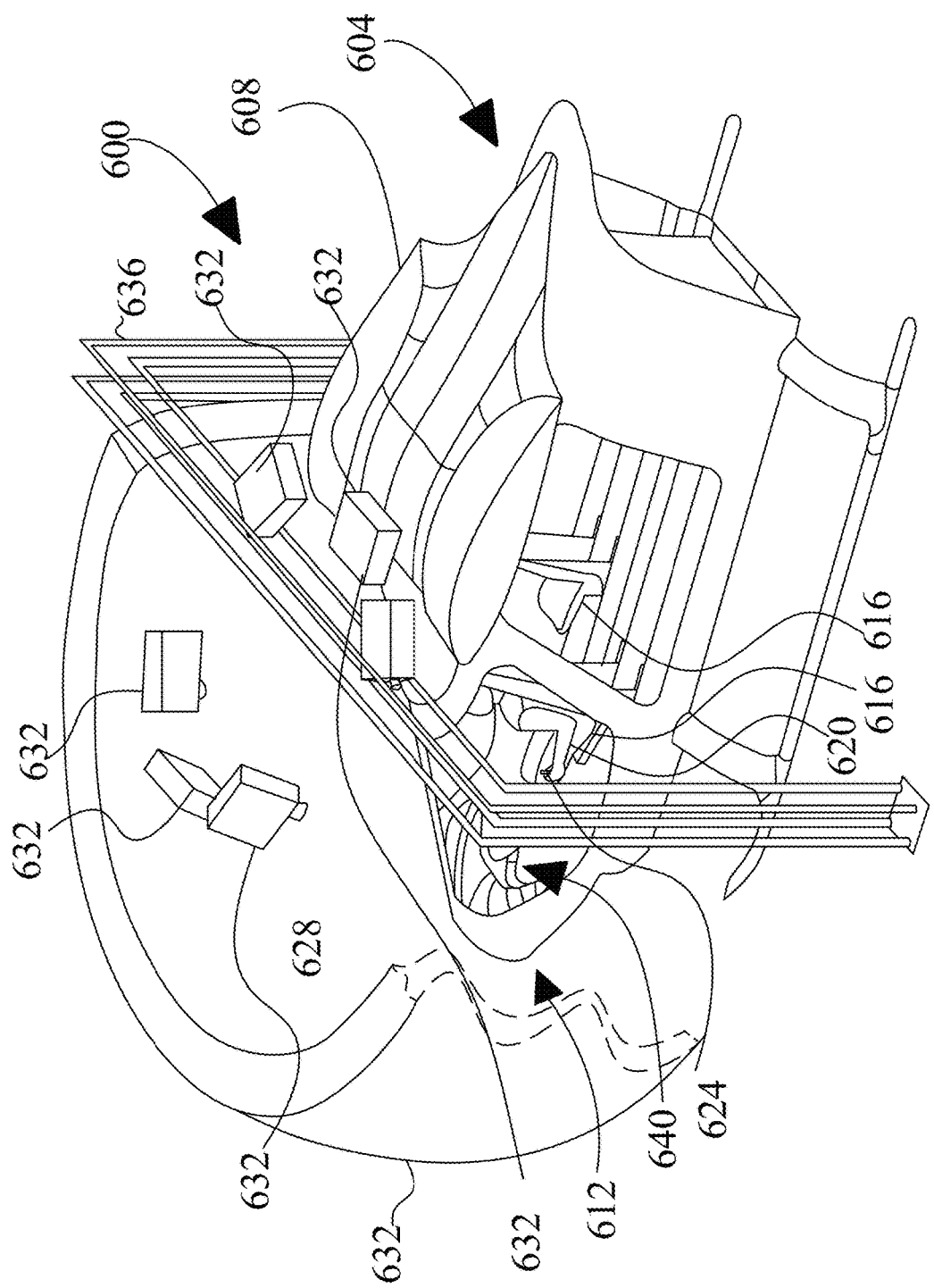
FIG. 6 is an exemplary embodiment of an isometric view of a system for a modular mobile flight simulator for an electric aircraft.

Referring now to FIG. 6, an exemplary illustration of a system 600 for a modular mobile flight simulator for an electric aircraft is provided. The simulator module may be consistent with any simulator module as described herein. System 600 may include a fuselage 604. Fuselage 604 may be consistent with any fuselage as described in the entirety of this disclosure.

Still referring to FIG. 6, system 600 includes a concave screen 628 facing the fuselage 604. Concave screen 628 is illustrated in FIG. 6 as partially cut away to clearly show the rest of system 600. Concave screen 628 may be concave with respect to a horizontal axis and/or the concave screen 628 may be concave with respect to a vertical axis. Concave screen 628 may be substantially spherical, meaning the concave screen 628 may be shaped as a section of a substantially spherical shell. Projectors 632 are directed at concave screen 628 and the projectors 632 are each configured to project an image onto the concave screen 628. As used in this disclosure, the term "directed at" is defined as positioned in relation to concave screen 628 to project onto the concave screen 628. Projectors 632 may make use of reflective waveguides, diffractive waveguides, lenses, or the like to transmit, project, and/or display images. For instance, and without limitation, projectors 632 may project images through and/or reflect images off an eyeglass-like structure and/or lens piece, where either both field of vision and images from projectors 632 may be so displayed, or the former may be permitted to pass through a transparent surface. Projectors 632 may be incorporated in a contact lens or eye tap device, which may introduce images into light entering an eye to cause display of such images. Projectors 632 may display some images using a virtual retina display (VRD), which may display an image directly on a retina of pilot 620. In some embodiments, one or more screens may be positioned where windows in a cockpit would normally be located in an operable eVTOL aircraft to give the realistic appearance to pilot 620 of operating an eVTOL aircraft.

Still referring to FIG. 6, an augmented reality device may be implemented in any suitable way, including without limitation incorporation of or in a head mounted display, a head-up display, a display incorporated in eyeglasses, googles, headsets, helmet display systems, or the like, a display incorporated in contact lenses, an eye tap display system including without limitation a laser eye tap device, VRD, or the like. Persons skilled in the art, upon reviewing the entirety of this disclosure, will be aware of various optical projection and/or display technologies that may be incorporated in augmented reality device consistently with this disclosure.

Further referring to FIG. 6, projectors 632 and/or other display devices incorporated in augmented reality device may implement a stereoscopic display. A "stereoscopic display," as used in this disclosure, is a display that simulates a user experience of viewing a three-dimensional space and/or object, for instance by simulating and/or replicating different perspectives of a user's two eyes; this is in contrast to a two-dimensional image, in which images presented to each eye are substantially identical, such as may occur when viewing a flat screen display. Stereoscopic display may display two flat images having different perspectives, each to only one eye, which may simulate the appearance of an object or space as seen from the perspective of that eye. Alternatively or additionally, stereoscopic display may include a three-dimensional display such as a holographic display or the like. Persons skilled in the art, upon reviewing the entirety of this disclosure, will be aware of various alternative or additional types of stereoscopic display that may be employed in an augmented reality device.

Still referring to FIG. 6, projectors 632 may include a first group of projectors 632 and a second group of projectors 632, wherein the first group of the projectors 632 is angled downward at concave screen 628. As used in this disclosure, "angled downward" means that a central axis drawn from a center of an output aperture of a projector to a center of a region illuminated thereby on a screen will have a negative slope when proceeding from the projector to the screen; for instance, projectors 632 that are angled downward may be positioned level with or above the horizontal axis of screen 628 and a central axis of each of the projectors 632 intersects concave screen 628 below the horizontal axis of concave screen 628. First group of projectors 632 may be positioned above fuselage 604. First group of projectors 632 may be angled downward at approximately the same angle relative to the vertical axis of concave screen 628. For example and without limitation, the first group of projectors may be angled thirty degrees downwards. In a non-limiting embodiment, the first group of projectors may be angled downwards between a range of zero degrees and ninety degrees. First group of projectors 632 may be equally spaced from neighboring projectors 632 of first group of projectors 632 with an equal horizontal angle between them. In a non-limiting embodiment, the first group of projectors may each be separated and horizontally angled by thirty degrees increments. For example and without limitation, one projector of the first group may be horizontally angled at zero degrees. Another projector of the first group may be horizontally angled at negative thirty degrees. Another projector of the first group may be horizontally angled at thirty degrees. Persons skilled in the art, upon reviewing the entirety of this disclosure, will be aware of the various angles and positioning of the group of projectors for purposes as described herein. Second group of projectors 632 may level. As used in this disclosure, "level" means the projectors 632 are oriented horizontally such that a central axis of each of the projectors 632 is substantially perpendicular to the vertical axis of concave screen 628. Second group of projectors 632 may be positioned above fuselage 604. In some embodiments, second group of projectors 632 may be oriented such that the central axis of each of the projectors 632 intersects concave screen 628 above the horizontal axis of concave screen 628. Second group of projectors 632 may be equally spaced from neighboring projectors 632 of second group of projectors 632.

In some embodiments and as shown in FIG. 6, system 600 may include four projectors 632, wherein two projectors 632 are included in first group of projectors 632 and two projectors 632 are included in second group of projectors 632. In a non-limiting embodiment, the plurality of projectors may be separated into groups to allow for efficient disassembly, packing, transportation, and reassembling. For example and without limitation, the simulator module may be disassembled into two groups and stored in two housing compartments configured to compactly and/or efficiently package and store the disassembled simulator module. This is so, at least in part, to allow for efficient transporting of the flight simulator as it is disassembled into cost effective and efficient parts that are portable as to a persons skilled in the art, upon reviewing the entirety of this disclosure, would appreciate the various embodiments of delineating the components of the simulator module for modular purposes as described herein. In a non-limiting embodiment, the plurality of projectors may work in tandem to blend a plurality of images projected by the projectors to form a distinct image. For example and without limitation, the first group of projectors may project one layer of the distinct image and a second group of projectors may project a second layer of the distinct image over the first layer to form the distinct image. In another non-limiting example, the first group of projects may be angled downwards and angled to the left while the second group of projectors may be angled downwards and angled to the right. The first group may project an image and the second group may project another image in which the two images may be overlapped and blended together to form the distinct image. In a non-limiting embodiment, concave screen 628 may include four adjacent screens connected to each other to form concave screen 628 in which an individual projector 632 of a plurality of projectors may be assigned to project an image onto an associated adjacent screen, thus forming the distinct image. In another non-limiting embodiment, a single projector 632 may be configured to produce the distinct image individually in the event other projectors of the plurality of projectors are unable to. The plurality of projectors may further work in tandem to produce the distinct image in the event one or more projectors malfunction in which the remaining projectors may compensate for the malfunctioning projectors to produce the distinct image. Persons skilled in the art, upon reviewing the entirety of this disclosure, will be aware of the various embodiments of multiple projectors to project a single distinct image for purpose as described herein.

With continued reference to FIG. 6, the first group of projectors 632 and second group of projectors 632 may each include various numbers of projectors 632, such as one, two, three, four, or more. The number of projectors 632 in first group of projectors 632 may differ from the number of projectors 632 in second group of projectors 632. Projectors 632 may be configured to each project a distinct image. Projectors 632 may be oriented such that each of the images projected from the projectors 632 at least partially overlaps another projected image. Projectors 632 may be attached to or otherwise on fuselage 604 or the projectors 632 may be attached to an independent supportive structure such as scaffolding 636.

With continued reference to FIG. 6, system 600 may include a computing device 640 communicatively connected to projectors 632. In a non-limiting embodiment, computing device may be consistent with computing device 112 and/or any computing device as described in the entirety of this disclosure. In a non-limiting embodiment, computing device 640 may be configured to operate a flight simulator. The flight simulator may be consistent with simulation device 204 as described in the entirety of this disclosure. In some cases, a flight simulator may simulate flight within an environment, for example an environmental atmosphere in which aircraft fly, airports at which aircraft take-off and land, and/or mountains and other hazards aircraft attempt to avoid crashing into. In some cases, an environment may include geographical, atmospheric, and/or biological features. In some cases, a flight simulator may model an artificial and/or virtual aircraft in flight as well as an environment in which the artificial and/or virtual aircraft flies. In some cases, a flight simulator may include one or more physics models, which represent analytically or through data-based, such as without limitation machine-learning processes, physical phenomenon. Physical phenomenon may be associated with an aircraft and/or an environment. For example, some versions of a flight simulator may include thermal models representing aircraft components by way of thermal modeling. Thermal modeling techniques may, in some cases, include analytical representation of one or more of convective hear transfer (for example by way of Newton's Law of Cooling), conductive heat transfer (for example by way of Fourier conduction), radiative heat transfer, and/or advective heat transfer. In some cases, flight simulator may include models representing fluid dynamics. For example, in some embodiments, flight simulator may include a representation of turbulence, wind shear, air density, cloud, precipitation, and the like. In some embodiments, flight simulator may include at least a model representing optical phenomenon. For example, flight simulator may include optical models representative of transmission, reflectance, occlusion, absorption, attenuation, and scatter. Flight simulator may include non-analytical modeling methods; for example, the flight simulator may include, without limitation, a Monte Carlo model for simulating optical scatter within a turbid medium, for example clouds. In some embodiments, a flight simulator may represent Newtonian physics, for example motion, pressures, forces, moments, and the like.

Still referring to FIG. 6, computing device 640 is configured to receive pilot datum detected by pilot inputs 624, generate a simulated eVTOL flight maneuver as a function of pilot datum, and command plurality of projectors 632 to display one or more images based on simulated flight maneuvers. In a non-limiting embodiment, the simulated flight maneuvers may include any movement or series of moves performed by an aircraft during commencement, operation, and/or termination of flight. A flight maneuver may include takeoff, landing, stability control maneuvers, emergency response maneuvers, regulation of altitude, roll, pitch, yaw, speed, acceleration, or the like during any phase of flight. A flight maneuver may include a flight plan or sequence of maneuvers to be performed during a flight plan. With continued reference to FIG. 6, system 600 may include a controller, such as a flight controller.

With continued reference to FIG. 6, computing device 640 may command plurality of projectors 632 to each display an image distinct such that each projector of plurality of projectors 632 is configured to project an image that is different than the other images projected by the other projectors 632. One, some, or all of images may at least partially overlap one or more of the other images, which may ensure that the overall resulting image is continuous without gaps in it. At least partially overlapping images may also increase the resolution and quality of the overall resulting image displayed on the concave screen 628. System 600 may include speakers communicatively connected to computing device 640 for a further immersive experience, wherein the speakers provide audible environmental sounds for a further immersive experience. Speakers may provide surround sound to allow pilot 620 to identify the direction from which distinct noises are emanating. System 600 may include a full motion system to move and vibrate cockpit 612 or chair or entire fuselage 604. Movement may include lateral and rotational movement.

With continued reference to FIG. 6, computing device 640 may be designed and/or configured to perform any method, method step, or sequence of method steps in any embodiment described in this disclosure, in any order and with any degree of repetition. For instance, computing device 640 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 640 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 7:
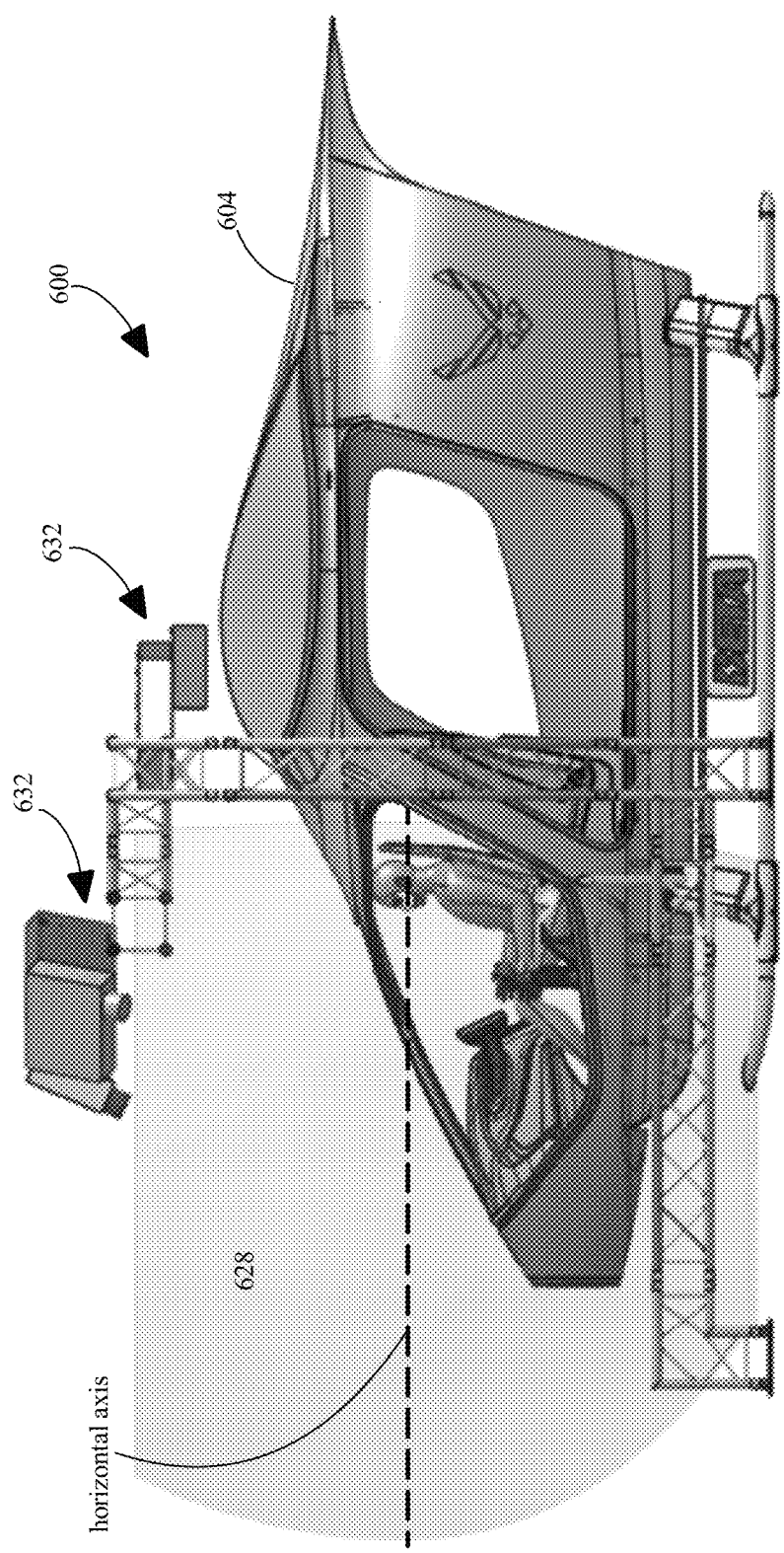
FIG. 7 is an exemplary embodiment of a side view of the system for a modular mobile flight simulator for an electric aircraft illustrated in FIG. 1 according to an embodiment of the disclosure.

Referring now to FIG. 7, an exemplary embodiment of a side view of the system 600 for a modular mobile flight simulator for an electric aircraft is provided. System 600 may include projectors 632 directed at concave screen 628 that is facing fuselage 604. Also shown in FIG. 7 is the horizontal axis of concave screen 208 depicting projectors 632 above the horizontal axis of the concave screen 628. As illustrated, some of projectors 632 are level and other projectors 632 are angled downward at concave screen 628. Also shown in FIG. 7 is the horizontal axis of concave screen 628 is substantially eye level of pilot 620. In some embodiments, the height of the horizontal axis of concave screen can be above or below the eye level of pilot 620.

Figure 8:
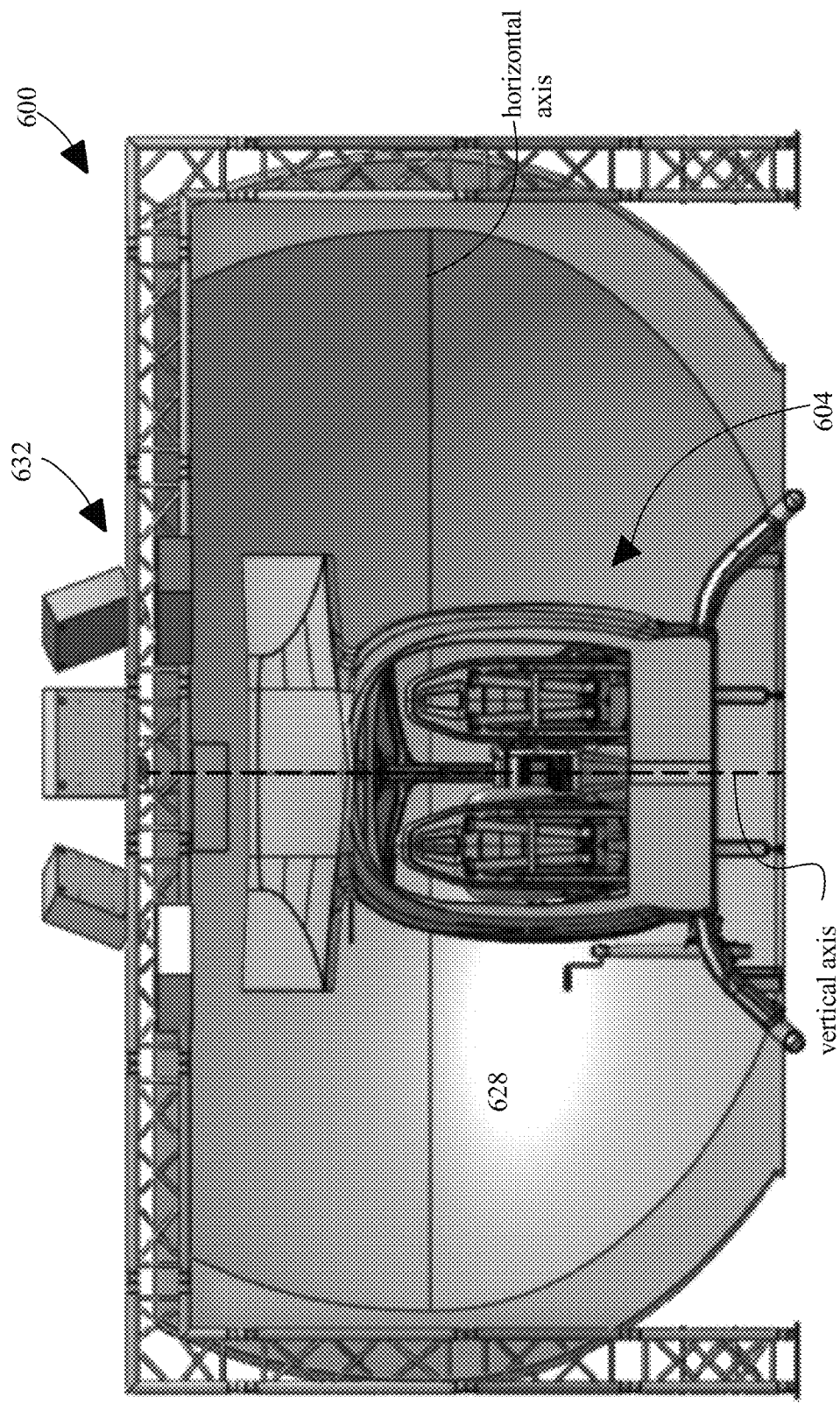
FIG. 8 is an exemplary embodiment of a rear view of the system for a modular mobile flight simulator for an electric aircraft illustrated in FIG. 1 according to an embodiment of the disclosure.

Referring now to FIG. 8, an exemplary embodiment of a rear view of the system 600 for a modular mobile flight simulator for an electric aircraft is provided. System 600 may include projectors 632 directed at concave screen 628 that is facing fuselage 604. Also shown in FIG. 8 are the vertical axis and horizontal axis of concave screen 628. As shown from the rear view of the system depicted in FIG. 8, fuselage 604 and cockpit 612 are positioned in front of the center of concave screen 628 such that the intersection of the horizontal axis and vertical axis of the concave screen 628 is approximately directly in pilot's line of vision.

Figure 9:
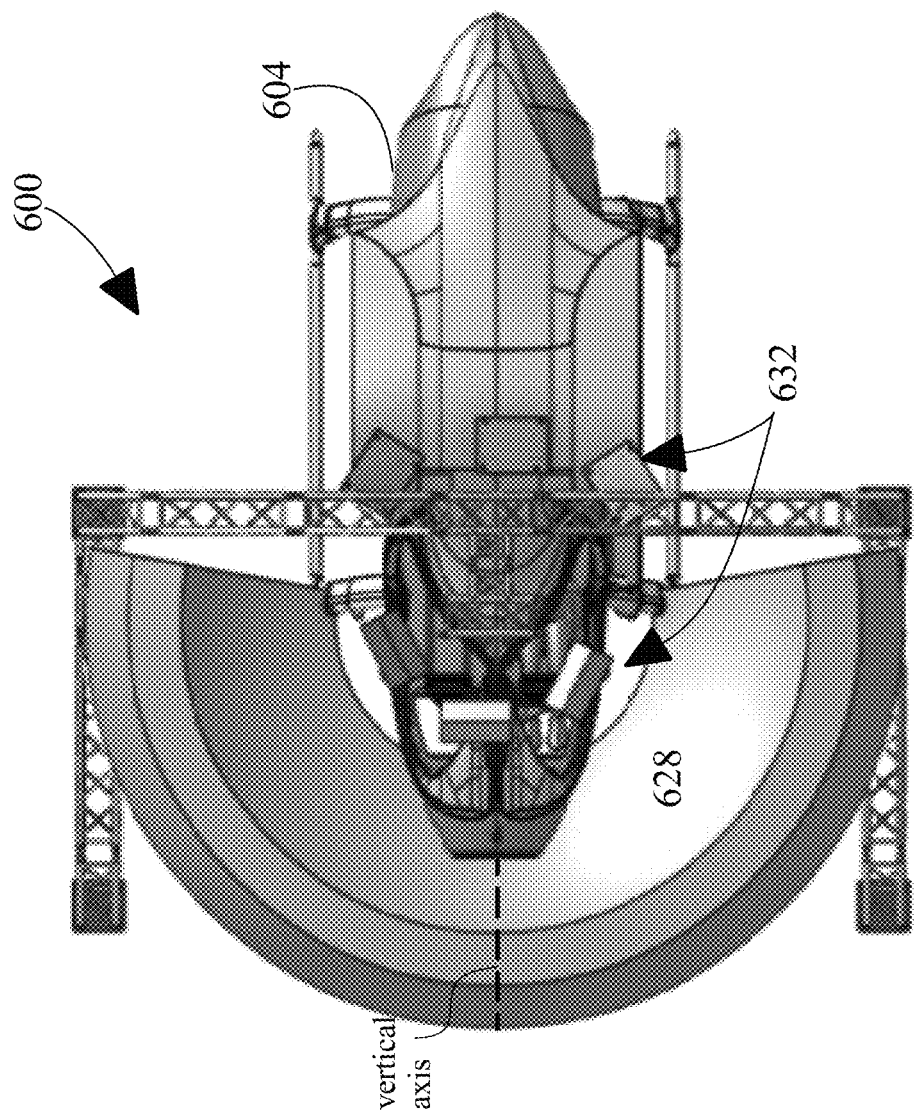
FIG. 9 is an exemplary embodiment of a top view of the system for a modular mobile flight simulator for an electric aircraft illustrated in FIG. 1 according to an embodiment of the disclosure.

Referring now to FIG. 9, an exemplary embodiment of a top view of the system 600 for a modular mobile flight simulator for an electric aircraft is provided. System 600 may include projectors 604 directed at a concave screen 608 that is facing a fuselage 604. In some embodiments, projectors 632 are positioned directly above cockpit 612. In some embodiments, projectors 632 that are angled downward are positioned between the center of concave screen 628 defined by the intersection of the horizontal and vertical axis of the concave screen.

Figure 10:
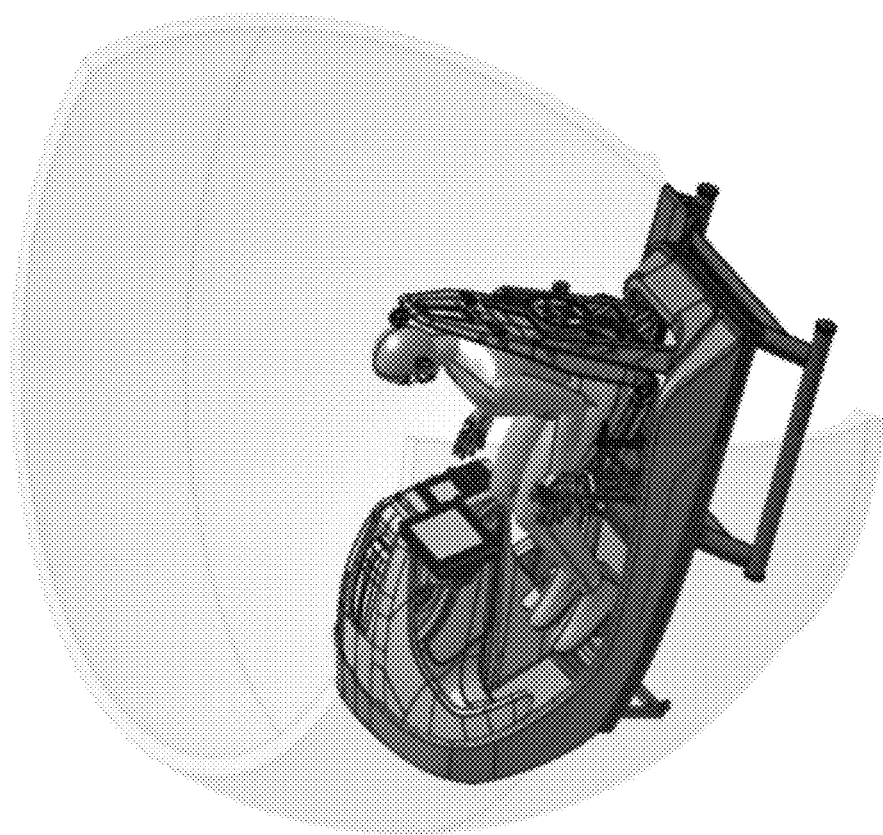
FIG. 10 is an exemplary embodiment of a flight simulator.

Now referring to FIG. 10, an exemplary embodiment of a Microdome flight simulator is illustrated. In a non-limiting embodiment, the Microdome flight simulator may be incorporated with simulator module 116. In another non-limiting embodiment, the Microdome flight simulator is similar to a Thunderdome flight simulator, but does not include a fuselage, more than one pilot, as many projectors, or autopilot. In a non-limiting embodiment, the Microdome is used for recruitment, development, and training, but not for certification like the Thunderdome. In a non-limiting embodiment, the Microdome is also smaller than the Thunderdome. The Microdome may be a modular device configured to perform the system described in FIG. 1. In a non-limiting embodiment, the Microdome may be configured to be a modular version of the Thunderome.

Figure 11:
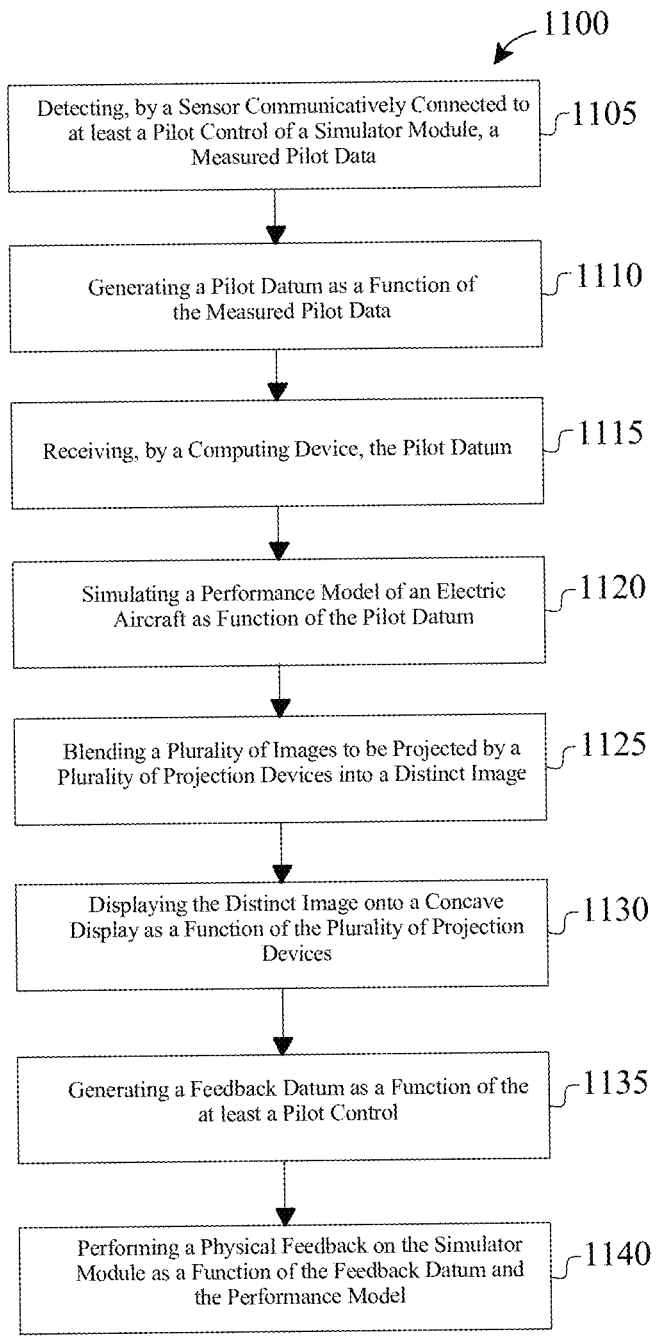
FIG. 11 is a flow diagram of an exemplary method for modular mobile flight simulator for an electric aircraft.
Figure 12:
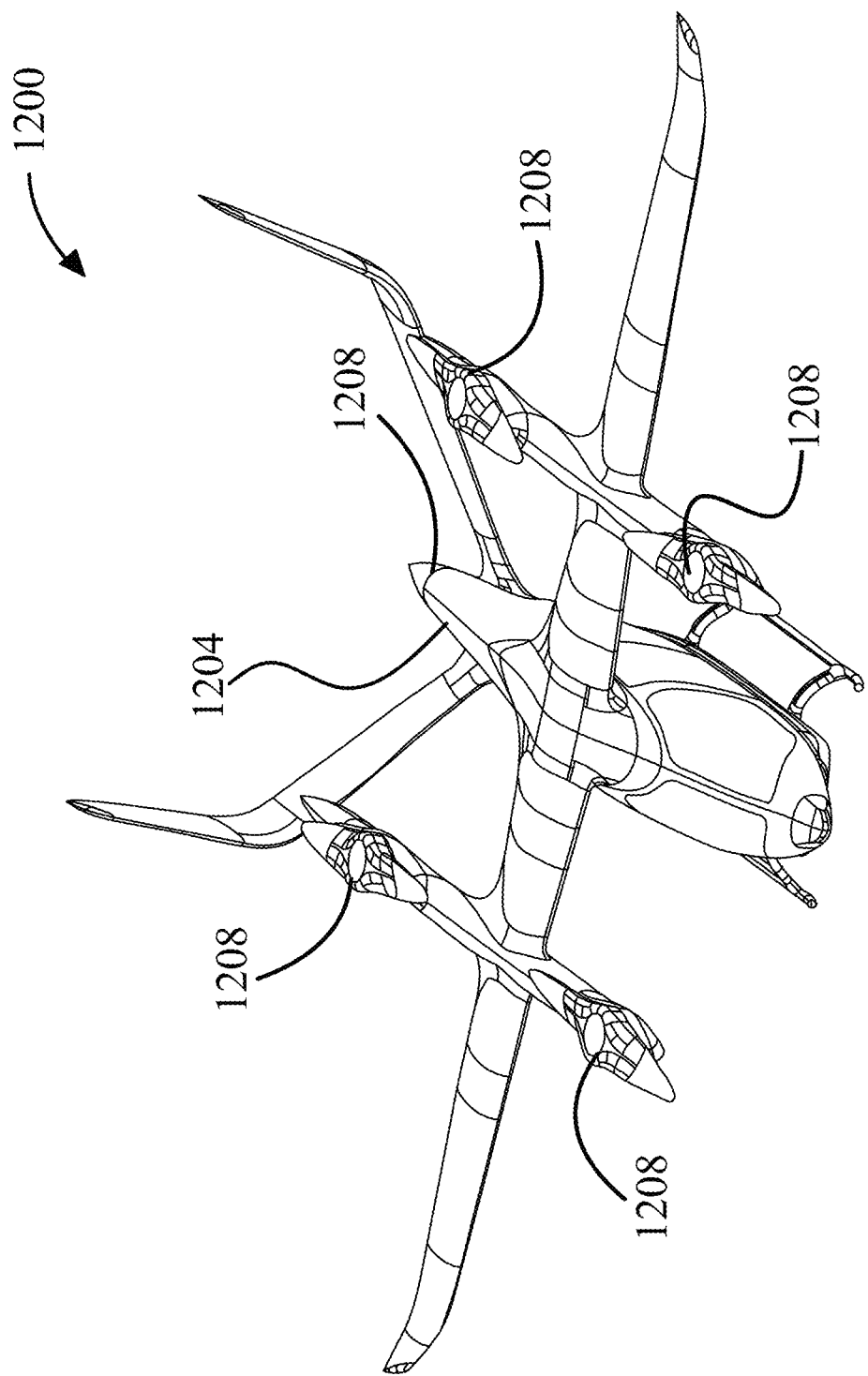
FIG. 12 is a diagrammatic representation of an exemplary embodiment of an electric aircraft.
Figure 13:
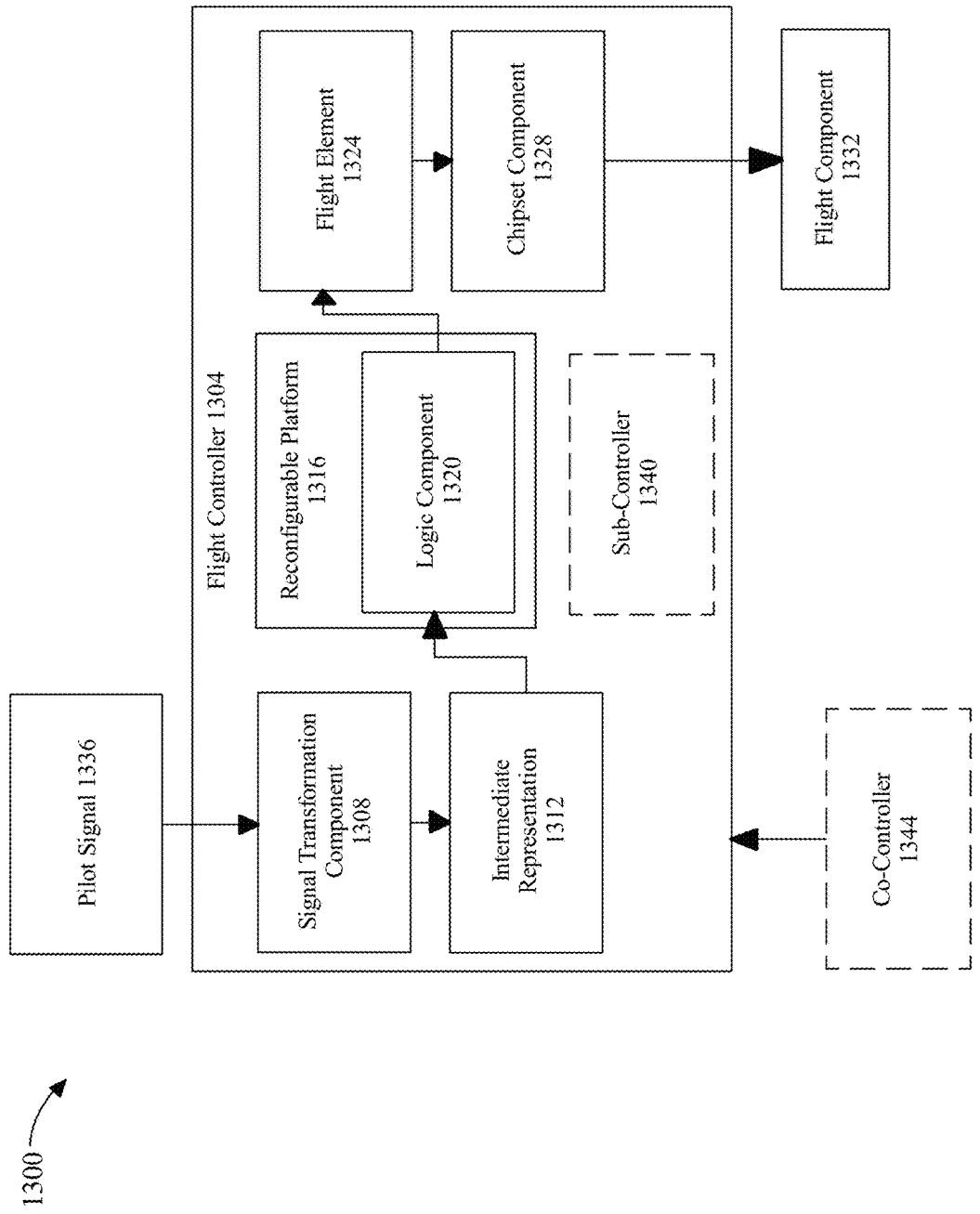
FIG. 13 is a block diagram of an exemplary flight controller.

Referring now to FIG. 11, a flow diagram of an exemplary method 1100 for modular mobile flight simulator for an electric aircraft is provided. Method 1100, at step 1105, may include detecting, by a sensor communicatively connected to at least a pilot control and a pilot device of a simulator module, a measured pilot data. The sensor may be consistent with any sensor as described in the entirety of this disclosure. In a non-limiting embodiment, the sensor may be communicatively connected to the at least a pilot control. The at least a pilot control may include any pilot control as described herein. The simulator module may include any simulator module as described herein. In a non-limiting embodiment, the sensor may be communicatively connected to the simulator module. In another non-limiting embodiment, the simulator module may incorporate a plurality of haptic technologies. The haptic technologies may include any haptic technology as described herein.

Still referring to FIG. 11, method 1100, at step 1110, may include generating a pilot datum as a function of the measured pilot data. The measured pilot data may include any measured pilot data as described herein. In a non-limiting embodiment, the sensor may constantly be detecting the measured pilot data and generating the pilot datum. Persons skilled in the art, upon reviewing the entirety of this disclosure, will be aware of the various methods of detecting, capturing, and measuring data for purposes as described herein.

Still referring to FIG. 11, method 1100, at step 1115, may include receiving, by a computing device, the pilot datum from the sensor. The computing device may include any computing device as described herein. The computing device may receive the pilot datum by any communication means as described in the entirety of this disclosure. In a non-limiting embodiment, the sensor may constantly be transmitting the pilot datum to the computing device for retrieval.

Still referring to FIG. 11, method 1100, at step 1120, may include simulating an aircraft model of the electric aircraft as a function of the pilot datum. The aircraft model of the electric aircraft may include any aircraft model and/or any model as described herein. In a non-limiting embodiment, method 1100 may include operating a simulation device to simulate the aircraft model. The simulation device may include any simulation device as described herein. In another non-limiting embodiment, method 1100 may include simulating a virtual environment for the aircraft model to operate in. The virtual environment may include any virtual environment as described in the entirety of this disclosure.

With continued reference to FIG. 11, method 1100, at step 1125, may include blending a plurality of images to be projected by a plurality of projection devices into a distinct image. The projection device may include any projection device as described herein. The distinct image may include any distinct image as described herein. In a non-limiting embodiment, method 1100, at step 1125 may include aligning a plurality of rendered and/or generated images with each other to produce the distinct image. Persons skilled in the art, upon reviewing the entirety of this disclosure, will be aware of the various methods and embodiments of aligning multiple images to generate a single distinct image for purpose as described in the entirety of this disclosure.

With continued reference to FIG. 11, method 1100, at step 1130, may include displaying the distinct image onto a concave display as a function of the plurality of projection devices. The concave display may include any concave display as described herein. In a non-limiting embodiment, displaying the distinct image may include displaying onto one or more adjacent displays. The adjacent display may include any adjacent display as described herein. In a non-limiting embodiment, displaying the distinct image may include simulating the distinct image of the virtual representation of the perspective of the simulated aircraft model. The virtual representation may include any virtual representation as described herein. In another non-limiting embodiment, displaying the distinct image may include displaying using four projection devices wherein each projection device is displaying a unique image to be aligned and/or blended with each other to display the distinct image.

With continued reference to FIG. 11, method 1100, at step 1135, may include generating a feedback datum as a function of the at least a pilot control. The feedback datum may include any feedback datum as described herein. In a non-limiting embodiment, the feedback datum may be generated as a function of the pilot datum. In a non-limiting embodiment, the feedback datum may be generated as a function of a machine-learning model and a feedback training set. The feedback training set may include any feedback training set as described herein.

With continued reference to FIG. 11, method 1100, at step 1140, may include performing a physical feedback on the simulator module as a function of the feedback datum and the aircraft model. The physical feedback may include any physical feedback as described herein. In a non-limiting embodiment, performing the physical feedback may include operating a plurality of haptic technologies incorporated into the simulator module to produce haptic effects onto the pilot. The haptic technologies may include any haptic technologies as described herein. The haptic effects may include any haptic effects as described herein. Persons skilled in the art, upon reviewing the entirety of this disclosure, will be aware of the various methods of producing physical sensations mimicking the flight of an electric aircraft for simulation and training purposes as described herein.

Still referring to FIG. 11, method 1100 may include supporting, by the computing device, a simulated avionics as a function of the simulator module. The simulated avionics may include any avionics as described herein. In a non-limiting embodiment, the avionics may be incorporated into the at least a pilot control of the simulator module in which the pilot may utilize. The avionics incorporated into the simulator module may be configured for simulation purposes as described herein.

Figure 14:
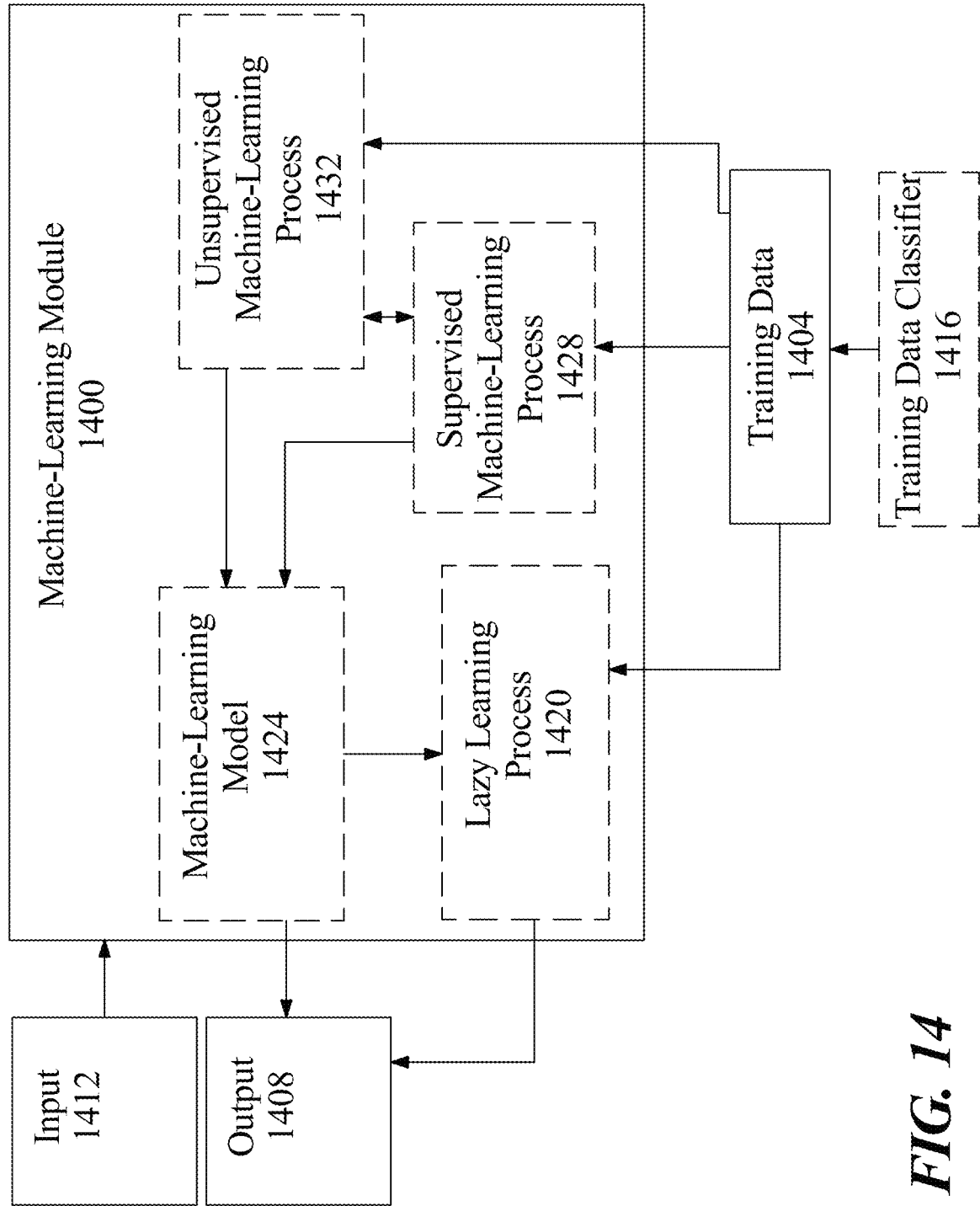
FIG. 14 is a block diagram of an exemplary machine-learning process.

Referring now to FIG. 14, an exemplary embodiment of a machine-learning module 1400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 1404 to generate an algorithm that will be performed by a computing device/module to produce outputs 1408 given data provided as inputs 1412; this is in contrast to a non-machine learning software program where the commands to be executed are determined in advance by a user and written in a programming language.

Still referring to FIG. 14, "training data," as used herein, is data containing correlations that a machine-learning process may use to model relationships between two or more categories of data elements. For instance, and without limitation, training data 1404 may include a plurality of data entries, each entry representing a set of data elements that were recorded, received, and/or generated together; data elements may be correlated by shared existence in a given data entry, by proximity in a given data entry, or the like. Multiple data entries in training data 1404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 1404 according to various correlations; correlations may indicate causative and/or predictive links between categories of data elements, which may be modeled as relationships such as mathematical relationships by machine-learning processes as described in further detail below. Training data 1404 may be formatted and/or organized by categories of data elements, for instance by associating data elements with one or more descriptors corresponding to categories of data elements. As a non-limiting example, training data 1404 may include data entered in standardized forms by persons or processes, such that entry of a given data element in a given field in a form may be mapped to one or more descriptors of categories. Elements in training data 1404 may be linked to descriptors of categories by tags, tokens, or other data elements; for instance, and without limitation, training data 1404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 14, training data 1404 may include one or more elements that are not categorized; that is, training data 1404 may not be formatted or contain descriptors for some elements of data. Machine-learning algorithms and/or other processes may sort training data 1404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 1404 to be made applicable for two or more distinct machine-learning algorithms as described in further detail below. Training data 1404 used by machine-learning module 1400 may correlate any input data as described in this disclosure to any output data as described in this disclosure. As a non-limiting illustrative example the flight maneuvers of the pilot datum may be inputs and the feedback datum may be an output.

Further referring to FIG. 14, training data may be filtered, sorted, and/or selected using one or more supervised and/or unsupervised machine-learning processes and/or models as described in further detail below; such models may include without limitation a training data classifier 1416. Training data classifier 1416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 1400 may generate a classifier using a classification algorithm, defined as a processes whereby a computing device and/or any module and/or component operating thereon derives a classifier from training data 1404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 1416 may classify elements of training data to various elements of physical feedback for different flight maneuvers for which a subset of training data may be selected.

Still referring to FIG. 14, machine-learning module 1400 may be configured to perform a lazy-learning process 1420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 1404. Heuristic may include selecting some number of highest-ranking associations and/or training data 1404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 14, machine-learning processes as described in this disclosure may be used to generate machine-learning models 1424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 1424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 1424 may be generated by creating an artificial neural network, such as a convolutional neural network comprising an input layer of nodes, one or more intermediate layers, and an output layer of nodes. Connections between nodes may be created via the process of "training" the network, in which elements from a training data 1404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 14, machine-learning algorithms may include at least a supervised machine-learning process 1428. At least a supervised machine-learning process 1428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include the flight maneuvers and/or the pilot datum as described above as inputs, the feedback datum as an output, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 1404. Persons skilled in the art, upon reviewing the entirety of this disclosure, will be aware of various possible variations of at least a supervised machine-learning process 1428 that may be used to determine relation between inputs and outputs. Supervised machine-learning processes may include classification algorithms as defined above.

Further referring to FIG. 14, machine learning processes may include at least an unsupervised machine-learning processes 1432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 14, machine-learning module 1400 may be designed and configured to create a machine-learning model 1424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 14, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 15:
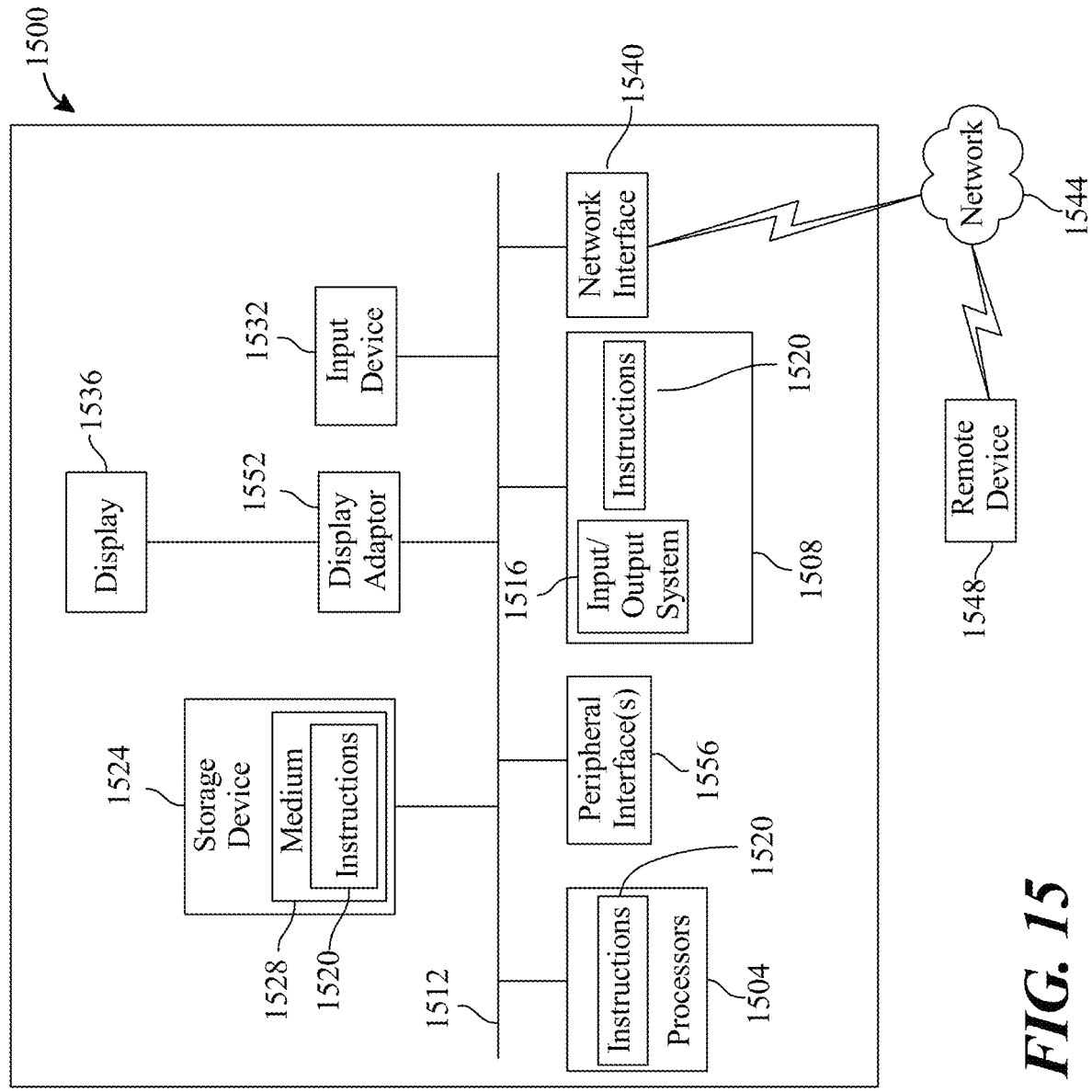
FIG. 15 is a block diagram of a computing system that can be used to implement any one or more of the methodologies disclosed herein and any one or more portions thereof.

FIG. 15 shows a diagrammatic representation of one embodiment of a computing device in the exemplary form of a computer system 1500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1500 includes a processor 1504 and a memory 1508 that communicate with each other, and with other components, via a bus 1512. Bus 1512 may include any of several types of bus structures including, but not limited to, a memory bus, a memory controller, a peripheral bus, a local bus, and any combinations thereof, using any of a variety of bus architectures.

Processor 1504 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1504 may be organized according to Von Neumann and/or Harvard architecture as a non-limiting example. Processor 1504 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 1508 may include various components (e.g., machine-readable media) including, but not limited to, a random-access memory component, a read only component, and any combinations thereof. In one example, a basic input/output system 1516 (BIOS), including basic routines that help to transfer information between elements within computer system 1500, such as during start-up, may be stored in memory 1508. Memory 1508 may also include (e.g., stored on one or more machine-readable media) instructions (e.g., software) 1520 embodying any one or more of the aspects and/or methodologies of the present disclosure. In another example, memory 1508 may further include any number of program modules including, but not limited to, an operating system, one or more application programs, other program modules, program data, and any combinations thereof.

Computer system 1500 may also include a storage device 1524. Examples of a storage device (e.g., storage device 1524) include, but are not limited to, a hard disk drive, a magnetic disk drive, an optical disc drive in combination with an optical medium, a solid-state memory device, and any combinations thereof. Storage device 1524 may be connected to bus 1512 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1524 (or one or more components thereof) may be removably interfaced with computer system 1500 (e.g., via an external port connector (not shown)). Particularly, storage device 1524 and an associated machine-readable medium 1528 may provide nonvolatile and/or volatile storage of machine-readable instructions, data structures, program modules, and/or other data for computer system 1500. In one example, software 1520 may reside, completely or partially, within machine-readable medium 1528. In another example, software 1520 may reside, completely or partially, within processor 1504.

Computer system 1500 may also include an input device 1532. In one example, a user of computer system 1500 may enter commands and/or other information into computer system 1500 via input device 1532. Examples of an input device 1532 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1532 may be interfaced to bus 1512 via any of a variety of interfaces (not shown) including, but not limited to, a serial interface, a parallel interface, a game port, a USB interface, a FIREWIRE interface, a direct interface to bus 1512, and any combinations thereof. Input device 1532 may include a touch screen interface that may be a part of or separate from display 1536, discussed further below. Input device 1532 may be utilized as a user selection device for selecting one or more graphical representations in a graphical interface as described above.

A user may also input commands and/or other information to computer system 1500 via storage device 1524 (e.g., a removable disk drive, a flash drive, etc.) and/or network interface device 1540. A network interface device, such as network interface device 1540, may be utilized for connecting computer system 1500 to one or more of a variety of networks, such as network 1544, and one or more remote devices 1548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1544, may employ a wired and/or a wireless mode of communication. In general, any network topology may be used. Information (e.g., data, software 1520, etc.) may be communicated to and/or from computer system 1500 via network interface device 1540.

Computer system 1500 may further include a video display adapter 1552 for communicating a displayable image to a display device, such as display device 1536. Examples of a display device include, but are not limited to, a liquid crystal display (LCD), a cathode ray tube (CRT), a plasma display, a light emitting diode (LED) display, and any combinations thereof. Display adapter 1552 and display device 1536 may be utilized in combination with processor 1504 to provide graphical representations of aspects of the present disclosure. In addition to a display device, computer system 1500 may include one or more other peripheral output devices including, but not limited to, an audio speaker, a printer, and any combinations thereof. Such peripheral output devices may be connected to bus 1512 via a peripheral interface 1556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods and systems according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for modular mobile flight simulator for an electric aircraft, the system comprising:
    a simulator module, wherein the simulator module comprises:
        a concave display, wherein the concave display is configured to implement a stereoscopic display, the stereoscopic display comprising a three-dimensional display;
        a plurality of projection devices;
        a pilot device; and
        at least a pilot control communicatively connected to the pilot device and a sensor, wherein the sensor is configured to:
            detect a measured pilot data; and
            generate a pilot datum as a function of the measured pilot data, wherein the pilot datum includes a status datum;
    a computing device communicatively connected to the simulator module, the computing device configured to:
        receive the pilot datum from the sensor;
        simulate an aircraft model of the electric aircraft as a function of the pilot datum;
        generate a feedback datum as a function of the at least a pilot control;
        blend a plurality of images to be projected by the plurality of projection devices into a distinct image, wherein the plurality of images includes the feedback datum;
        display the distinct image and the feedback datum onto the concave display as a function of the plurality of projection devices; and
        perform a physical feedback on the simulator module as a function of the feedback datum and the aircraft model.

2. The system of claim 1, wherein the simulator module further comprises a partial fuselage.

3. The system of claim 1, wherein the simulator module further comprises a seat for a pilot.

4. The system of claim 1, wherein the concave display further comprises one or more adjacent displays.

5. The system of claim 4, wherein the computing device is further configured to align the adjacent displays to form the concave display.

6. The system of claim 1, wherein the computing device is further configured to operate a simulation device, wherein the simulation device is configured to simulate a virtual representation comprising the aircraft model of the electric aircraft.

7. The system of claim 6, wherein the simulation device is further configured to simulate a virtual environment for the aircraft model of the electric aircraft.

8. The system of claim 6, wherein the distinct image further comprises a virtual environment of the perspective of the simulated aircraft model.

9. The system of claim 1, wherein the computing device is further configured to support simulated avionics, using the pilot device, as a function of the simulator module.

10. The system of claim 1, wherein the feedback datum comprises a pilot score associated with electric energy efficiency.

11. A method for modular mobile flight simulator for an electric aircraft, the method comprising:
    detecting, by a sensor communicatively connected to at least a pilot control and a pilot device of a simulator module, a measured pilot data;
    generating a pilot datum as a function of the measured pilot data, wherein the pilot datum includes a status datum;
    receiving, by a computing device, the pilot datum from the sensor;
    simulating an aircraft model of the electric aircraft as a function of the pilot datum;
    generating a feedback datum as a function of the at least a pilot control;
    blending a plurality of images to be projected by a plurality of projection devices into a distinct image, the plurality of images comprising the feedback datum;
    displaying the distinct image onto a concave display as a function of the plurality of projection devices, wherein the concave display comprises a three-dimensional display; and
    performing a physical feedback on the simulator module as a function of the feedback datum and the aircraft model.

12. The method of claim 11, wherein the simulator module further comprises a partial fuselage.

13. The method of claim 11, wherein the simulator module further comprises a seat for at least a pilot.

14. The method of claim 11, wherein the concave display further comprises one or more adjacent displays.

15. The method of claim 1, wherein blending the plurality of images to be projected by the plurality of projection devices further comprises aligning the adjacent displays to form the concave display.

16. The method of claim 11, wherein the method further comprises operating a simulation device, wherein operating the simulation device further comprises simulating a virtual representation comprising the aircraft model of the electric aircraft.

17. The method of claim 16, wherein operating the simulation device further comprises simulating a virtual environment for the aircraft model of the electric aircraft.

18. The method of claim 16, wherein simulating the virtual environment further comprises simulating the distinct image, wherein the distinct image comprises a virtual representation of the perspective of the simulated aircraft model.

19. The method of claim 11, wherein the method further comprises supporting, by the computing device and the pilot device, a simulated avionics as a function of the simulator module.

20. The method of claim 11, wherein the feedback datum comprises a pilot score associated with electric energy efficiency.

* * * * *